US012033567B2

(12) United States Patent
Kim et al.

(10) Patent No.: US 12,033,567 B2
(45) Date of Patent: *Jul. 9, 2024

(54) DISPLAY DEVICE

(71) Applicant: Samsung Display Co., Ltd., Yongin-Si (KR)

(72) Inventors: Dong Hwi Kim, Yongin-si (KR); Na Young Kim, Yongin-si (KR); Jin Jeon, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,956

(22) Filed: Apr. 20, 2023

(65) Prior Publication Data

US 2023/0260451 A1 Aug. 17, 2023

Related U.S. Application Data

(63) Continuation of application No. 17/735,438, filed on May 3, 2022, now Pat. No. 11,715,415, which is a (Continued)

(30) Foreign Application Priority Data

Jul. 26, 2019 (KR) ........................ 10-2019-0091290

(51) Int. Cl.
*G09G 3/32* (2016.01)

(52) U.S. Cl.
CPC ......... *G09G 3/32* (2013.01); *G09G 2310/062* (2013.01); *G09G 2310/08* (2013.01); *G09G 2320/0247* (2013.01)

(58) Field of Classification Search
CPC ...... G09G 3/32; G09G 3/3233; G09G 3/3225; G09G 3/3208; G09G 2310/062; (Continued)

(56) References Cited

U.S. PATENT DOCUMENTS 7,414,599 B2 8/2008 Chung et al.
8,994,619 B2 3/2015 Jeong
(Continued)

FOREIGN PATENT DOCUMENTS

CN 1577453 A 2/2005
CN 102568374 A 7/2012
(Continued)

OTHER PUBLICATIONS

Chinese Office Action issued for Application No. 202010722676.7 on Mar. 25, 2024, 7 pages.

*Primary Examiner* — David Tung
(74) *Attorney, Agent, or Firm* — Innovation Counsel LLP

(57) ABSTRACT

A display device includes pixels which are connected to first scan lines, second scan lines, third scan lines, emission control lines, and data lines; a scan driver which supplies a bias scan signal to each of the third scan lines at a first frequency and supplies a scan signal to each of the first scan line and the second scan line at a second frequency which corresponds to an image refresh rate of each of the pixels; an emission driver which supplies an emission control signal to each of the emission control lines at the first frequency; a data driver which supplies a data signal to each of the data lines at the second frequency; and a timing controller which controls driving of the scan driver, the emission driver, and the data driver.

17 Claims, 29 Drawing Sheets

Related U.S. Application Data continuation of application No. 17/350,042, filed on Jun. 17, 2021, now Pat. No. 11,373,588, which is a continuation of application No. 16/826,376, filed on Mar. 23, 2020, now Pat. No. 11,056,049.

(58) Field of Classification Search

CPC ....... G09G 2310/08; G09G 2310/0205; G09G 2310/0243; G09G 2310/06; G09G 2320/0247; G09G 2330/021; G09G 2340/0435

See application file for complete search history.

(56) References Cited

U.S. PATENT DOCUMENTS

| | | | | |
|---|---|---|---|---|
| 9,299,279 | B2 | 3/2016 | Chung et al. | |
| 10,176,756 | B2 | 1/2019 | Hwang et al. | |
| 10,467,964 | B2 | 11/2019 | Gupta et al. | |
| 10,847,088 | B2 | 11/2020 | Byun et al. | |
| 10,861,393 | B2 | 12/2020 | Kim et al. | |
| 10,861,409 | B2 | 12/2020 | Lee et al. | |
| 10,909,918 | B2 | 2/2021 | Kim et al. | |
| 10,957,249 | B2 * | 3/2021 | Lee | G09G 3/3233 |
| 11,056,049 | B2 | 7/2021 | Kim et al. | |
| 11,270,650 | B2 * | 3/2022 | Seo | G09G 3/3233 |
| 11,373,588 | B2 | 6/2022 | Kim et al. | |
| 2012/0105390 | A1 | 5/2012 | Kim et al. | |
| 2017/0018220 | A1 * | 1/2017 | Takahara | G09G 3/30 |
| 2018/0293939 | A1 * | 10/2018 | Kim | H10K 50/805 |
| 2019/0096330 | A1 * | 3/2019 | Kim | G09G 3/3266 |
| 2020/0394961 | A1 * | 12/2020 | Kim | G09G 3/3291 |
| 2021/0020109 | A1 * | 1/2021 | Lin | G09G 3/3233 |
| 2022/0230586 | A1 * | 7/2022 | Jeong | G09G 3/3233 |

FOREIGN PATENT DOCUMENTS

| | | | |
|---|---|---|---|
| CN | 107705751 | A | 2/2018 |
| CN | 108010486 | A | 5/2018 |
| CN | 108172160 | A | 6/2018 |
| CN | 108428427 | A | 8/2018 |
| CN | 108694909 | A | 10/2018 |
| KR | 10-0560780 | B1 | 3/2006 |
| KR | 10-1879779 | B1 | 7/2018 |
| KR | 10-2018-0131682 | A | 12/2018 |
| KR | 10-20190034375 | A | 4/2019 |
| KR | 10-2020-0142646 | A | 12/2020 |

* cited by examiner

DISPLAY DEVICE

CROSS-REFERENCE TO RELATED APPLICATION

This application is a continuation application of U.S. patent application Ser. No. 17/735,438 filed on May 3, 2022, which is a continuation application of U.S. patent application Ser. No. 17/350,042 filed on Jun. 17, 2021, now U.S. Pat. No. 11,373,588, which is a continuation application of U.S. patent application Ser. No. 16/826,376 filed on Mar. 23, 2020, now U.S. Pat. No. 11,056,049, which claims priority under 35 USC § 119 to Korean Patent Application No. 10-2019-0091290 filed in the Korean Intellectual Property Office on Jul. 26, 2019, the disclosures of which are incorporated herein in their entirety by reference.

BACKGROUND

1. Field

The present inventive concept relates to a display device, and more specifically, to a display device applied to various driving frequencies.

2. Description of the Related Art

With the development of information technology, the importance of display devices, which are connection media between a user and information, is being emphasized.

The display device includes a plurality of pixels. Each of the pixels includes a plurality of transistors, a light-emitting element electrically connected to the transistors, and a capacitor. The transistors are turned on in response to signals provided through signal lines, thereby generating a certain driving current. The light-emitting element emits light in response to the driving current.

Recently, to improve driving efficiency of a display device and minimize power consumption thereof, a method has been used in which the display device is driven at a low frequency. Therefore, there is a need for a method capable of improving display quality when a display device is driven at a low frequency.

SUMMARY

An exemplary embodiment of the present inventive concept provides a display device driven at various driving frequencies.

It should be understood, however, that the object of the present inventive concept may be not to be limited by the foregoing object, but may be variously expanded without departing from the spirit and scope of the present inventive concept.

A display device according to exemplary embodiments of the present inventive concept includes pixels which are connected to first scan lines, second scan lines, third scan lines, emission control lines, and data lines; a scan driver which supplies a bias scan signal to each of the third scan lines at a first frequency and supplies a scan signal to each of the first scan line and the second scan line at a second frequency which corresponds to an image refresh rate of each of the pixels; an emission driver which supplies an emission control signal to each of the emission control lines at the first frequency; a data driver which supplies a data signal to each of the data lines at the second frequency; and a timing controller which controls driving of the scan driver, the emission driver, and the data driver.

According to an exemplary embodiment, the first frequency may be greater than the second frequency.

According to an exemplary embodiment, the second frequency may correspond to a proper divisor of the first frequency.

According to an exemplary embodiment, the first frequency corresponds to twice a maximum refresh rate of the display device.

According to an exemplary embodiment, the emission driver may supply the emission control signal to each of the emission control lines at the first frequency that is twice the maximum refresh rate of the display device.

According to an exemplary embodiment, the scan driver may include a first scan driver which supplies a writing scan signal to the first scan lines at the second frequency; a second scan driver which supplies a compensation scan signal to the second scan lines at the second frequency; and a third scan driver which supplies a bias scan signal to the third scan lines at the first frequency.

According to an exemplary embodiment, the first scan driver and the second scan driver may supply the writing scan signal and the compensation scan signal during a display scan period in one frame period. The first scan driver and the second scan driver may not supply the writing scan signal and the compensation scan signal during a self-scan period in the one frame period. The data signal may be written to the pixels in the display scan period, and the third scan driver may supply the bias scan signal in the self-scan period so that bias may be applied to a driving transistor included in each of the pixels.

According to an exemplary embodiment, when the pixels are driven at a maximum refresh rate, the number of repetition times of the display scan period may be the same as the number of repetition times of the self-scan period.

According to an exemplary embodiment, when the image refresh rate is decreased, the number of the self-scan periods may be increased.

According to an exemplary embodiment, the emission driver may include a first emission driver which supplies a first emission control signal to first emission control lines connected to the pixels at the first frequency; and a second emission driver which supplies a second emission control signal to second emission control lines connected to the pixels at the first frequency.

According to an exemplary embodiment, each of pixels positioned in an i-th horizontal line of the pixels may include a light-emitting element which includes a first electrode and a second electrode connected to a second power source; a first transistor which includes a first electrode which is connected to a first node electrically connected to a first power source and controls a driving current based on a voltage of a second node; a second transistor which is connected between a data line and the first node and is turned on by the writing scan signal supplied to an i-th first scan line; a third transistor which is connected between a third node to which the second electrode of the first transistor is connected and the second node and is turned on by the compensation scan signal supplied to an i-th second scan line; a fourth transistor which is connected between the third node and an i-th first emission control line and is turned on by the bias scan signal supplied to an i-th third scan line; a fifth transistor which is connected between the first power source and the first node and is turned off by the first emission control signal supplied to an i-th first emission control line; a sixth transistor which is connected to the third node and the first electrode of the light-emitting element and is turned off by the second emission control signal supplied to an i-th second emission control line; and a storage capacitor which is connected between the first power source and the second node, wherein i is a natural number.

According to an exemplary embodiment, each of the pixels positioned in the i-th horizontal line may further include a seventh transistor which is connected between the first electrode of the light-emitting element and an initialization power source and is turned on by the first emission control signal or the second emission control signal.

According to an exemplary embodiment, each of the pixels positioned in the i-th horizontal line may further include an eighth transistor which is connected between the fifth transistor and the first node and is turned off by the second emission control signal supplied to the i-th second emission control line.

According to an exemplary embodiment, the first transistor, the second transistor, the fourth transistor, the fifth transistor, and the sixth transistor may be p-type transistors, and the third transistor and the seventh transistor may be n-type oxide semiconductor transistors.

According to an exemplary embodiment, a turn-on period of the third transistor and a turn-on period of the fourth transistor may not overlap each other.

According to an exemplary embodiment, each of the second scan driver, the third scan driver, the first emission driver, and the second emission driver may equally control pixels in a (2i-1)-th horizontal line and pixels in a 2i-th horizontal line, and the first scan driver may control the pixels in the (2i-1)-th horizontal line and the pixels in the 2i-th horizontal line at different times.

According to an exemplary embodiment, each of the pixels positioned in an i-th horizontal line of the pixels may include a light-emitting element which includes a first electrode and a second electrode connected to a second power source; a first transistor which includes a first electrode connected to a first node which is electrically connected to a first power source and controls a driving current based on a voltage of a second node; a second transistor which is connected between a data line and the first node and is turned on by the writing scan signal supplied to an i-th first scan line; a third transistor which is connected between a third node which is connected to the second electrode of the first transistor and the second node and is turned on by the compensation scan signal supplied to an i-th second scan line; and a fourth transistor which is turned on by the bias scan signal supplied to an i-th third scan line to apply a bias voltage to the first node, wherein i is a natural number. A first electrode of the fourth transistor may be connected to one of the i-th first scan line, an i-th first emission control line, an i-th second emission control line, and a bias power source, and a second electrode of the fourth transistor is connected to the first node.

According to an exemplary embodiment, the scan driver may further include a fourth scan driver which supplies an initialization scan signal to fourth scan lines at the second frequency.

According to an exemplary embodiment, each of pixels positioned in an i-th horizontal line of the pixels may include a light-emitting element which includes a first electrode and a second electrode connected to a second power source; a first transistor which includes a first electrode connected to a first node which is electrically connected to a first power source and controls a driving current based on a voltage of a second node; a second transistor which is connected between a data line and the first node and is turned on by the writing scan signal supplied to an i-th first scan line; a third transistor which is connected between a third node to which the second electrode of the first transistor is connected and the second node and is turned on by the compensation scan signal supplied to an i-th second scan line; a fourth transistor which is connected between the third node and an i-th emission control line or between the third node and a bias power source and is turned on by the bias scan signal supplied to an i-th third scan line; a fifth transistor which is connected between the first power source and the first node and is turned off by the first emission control signal supplied to an i-th emission control line; a sixth transistor which is connected to the third node and the first electrode of the light-emitting element and is turned off together with the fifth transistor; a seventh transistor which is connected between the first electrode of the light-emitting element and a first initialization power source and is turned on by the emission control signal or the bias scan signal; an eighth transistor which is connected between the second node and a second initialization power source and is turned on by the initialization scan signal supplied to an i-th fourth scan line; and a storage capacitor which is connected between the first power source and the second node, wherein i is a natural number.

According to an exemplary embodiment, after the fourth transistor is turned on, the eighth transistor may be turned on, and a turn-on period of the fourth transistor and a turn-on period of the eighth transistor may not overlap each other.

DETAILED DESCRIPTION OF THE EMBODIMENTS

Hereinafter, exemplary embodiments of the present inventive concept will be described in more detail with reference to the accompanying drawings. Like numbers refer to like elements throughout the description of the figures, and the description of the same component will not be reiterated.

Figure 1:
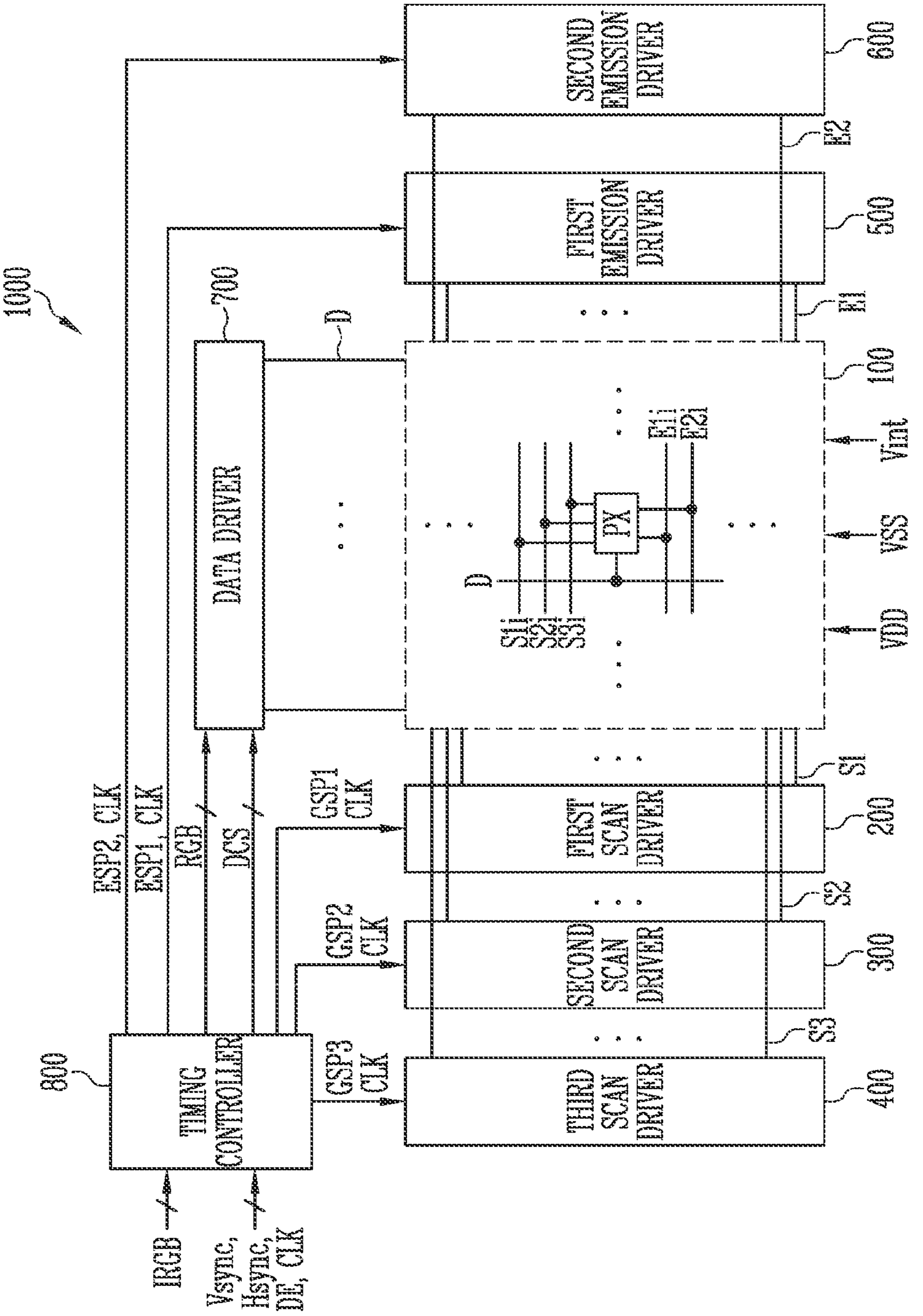
FIG. 1 is a block diagram illustrating a display device according to exemplary embodiments of the present inventive concept.

FIG. 1 is a block diagram illustrating a display device according to exemplary embodiments of the present inventive concept.

Referring to FIG. 1, a display device 1000 includes a pixel unit 100, scan drivers 200, 300, and 400, emission drivers 500 and 600, and a timing controller 800.

The scan drivers 200, 300, and 400 may include a first scan driver 200, a second scan driver 300, and a third scan driver 400. The emission drivers 500 and 600 may include a first emission driver 500 and a second emission driver 600. However, the classification of the scan driver and the emission driver is for convenience of description, and at least some of the scan drivers and the emission drivers may be integrated into one driving circuit and module, and the like.

The display device 1000 may display an image at various image refresh rates (driving frequency or screen refresh rate) according to driving conditions. The image refresh rate is a frequency of writing a data signal to a driving transistor of a pixel PX. For example, the image refresh rate is referred to as a screen refresh rate or a screen refresh frequency and refers to the number of times a display screen updates with new images each second.

In an exemplary embodiment, the image refresh rate corresponds an output frequency of a data driver 700 and/or the first scan driver 200 which outputs a writing scan signal. For example, a refresh rate for driving a moving picture may be a frequency of about 60 Hz or more, for example, 120 Hz.

In an exemplary embodiment, the display device 1000 may adjust an output frequency of the first scan driver 200 and the second scan driver 300, and an output frequency of the data driver 700 corresponding to the refresh rate depending on driving conditions. For example, the display device 1000 may display an image in response to various image refresh rates of 1 Hz to 120 Hz. However, this is merely an example, and the display device 1000 may display an image even at an image refresh rate of 120 Hz or more, for example, 240 Hz or 480 Hz.

The timing controller 800 may receive input image data IRGB and timing signals Vsync, Hsync, DE, and CLK from a host system such as an application processor (AP) or a graphic controller through a certain interface.

The timing controller 800 may generate a data driving control signal DCS based on the input image data IRGB and timing signals such as a vertical synchronization signal Vsync, a horizontal synchronization signal Hsync, a data enable signal DE, and clock signal CLK. The data driving control signal DCS may be supplied to the data driver 700. The timing controller 800 may transform the input image data IRGB into visual output RGB for display on display panel 116 and supplies the transformed input image data RGB to the data driver 700.

The timing controller 800 supplies gate start pulses GSP1, GSP2, and GPS3, and the clock signals CLK to the first scan driver 200, the second scan driver 300, and the third scan driver 400 in response to the timing signals.

The timing controller 800 supplies emission start pulses ESP1 and ESP2 and the clock signals CLK to the first emission driver 500 and the second emission driver 600 in response to the timing signals. The emission start pulse controls a rising edge or a falling edge of an emission control signal. The clock signals are used for synchronization of the emission start pulses.

A first gate start pulse GSP1 controls a rising edge or a falling edge of a scan signal (for example, a writing scan signal) supplied from the first scan driver 200. The clock signals CLK are used for synchronization of the first gate start pulse GSP1.

A second gate start pulse GSP2 controls a rising edge or a falling edge of a scan signal (for example, a compensation scan signal) supplied from the second scan driver 300. The clock signals CLK are used for synchronization of the second gate start pulse GSP2.

A third gate start pulse GSP3 controls a rising edge or a falling edge of a scan signal (for example, a bias scan signal) supplied from the third scan driver 400. The clock signals CLK are used for synchronization of the third gate start pulse GSP3.

In an exemplary embodiment, a pulse width of at least one of the first to third gate start pulses GSP1 to GSP3 may be different. Therefore, a width of a corresponding scan signal may also be changed.

The data driver 700 supplies data signals to data lines D in response to the data driving control signal DCS. The data signals supplied to the data lines D are supplied to the pixels PX selected by the scan signals.

The data driver 700 supplies the data signals to the data lines D during one frame period according to an image refresh rate. For example, the data driver 700 supplies the data signals to the data lines D at the same frequency as an image refresh rate. In this case, the data signals supplied to the data lines D may be supplied to be synchronized with the scan signals supplied to first scan lines S1.

The first scan driver 200 supplies the scan signals to the first scan lines S1 in response to the first gate start pulse GSP1. For example, the first scan driver 200 may sequentially supply the scan signals to the scan lines SL. Here, the scan signal is set to have a gate-on voltage so that a plurality of transistors connected to a respective first scan line is turned on.

In an exemplary embodiment, the scan signals supplied to the first scan lines S1 may be a writing scan signal. That is, when the writing scan signal is supplied, a data signal may be supplied to the pixel PX.

The first scan driver 200 may supply the scan signals to the first scan lines S1 at the same frequency (for example, a second frequency) as an image refresh rate of the display device 1000. In an exemplary embodiment, the second frequency may correspond to an output frequency of the first gate start pulse GSP1 supplied from the timing controller 800 to the first scan driver 200.

The second frequency may be set to a proper divisor of a first frequency for driving the emission drivers 500 and 600.

The first scan driver 200 supplies the scan signals to the first scan lines S1 during a display scan period of one frame. For example, the first scan driver 200 may supply at least one scan signal to each of the first scan lines S1 during the display scan period.

The second scan driver 300 supplies scan signals to second scan lines S2 in response to the second gate start pulse GSP2. For example, the second scan driver 300 may sequentially supply the scan signals to the second scan lines S2. Here, the scan signals supplied from the second scan driver 300 are set to have a gate-on voltage so that the transistor included in the pixel PX is turned on.

In an exemplary embodiment, the scan signals supplied to the second scan lines S2 may be a compensation scan signal. That is, when the compensation scan signal is supplied, the driving transistor of the pixel PX may be connected in the form of a diode.

The second scan driver 300 may supply the scan signals to the second scan lines S2 at the same frequency (for example, the second frequency) as output of the first scan driver 200. The second frequency may correspond to an output frequency of the second gate start pulse GSP2 supplied from the timing controller 800 to the second scan driver 300.

The second scan driver 300 supplies the scan signals to the second scan lines S2 during a display scan period of one frame. In an example, the second scan driver 300 may supply at least one scan signal to each of the second scan lines S2 during the display scan period.

The third scan driver 400 supplies scan signals to third scan lines S3 in response to the third gate start pulse GSP3. In an example, the third scan driver 400 may sequentially supply the control signals to the third control lines S3. Here, the scan signal is set to have a gate-on voltage so that the transistor included in the pixel PX is turned on.

In an exemplary embodiment, the scan signals supplied to the third scan lines S3 may be a bias scan signal. That is, when the bias scan signal is supplied, a certain bias voltage is applied to a source electrode and/or a drain electrode of the driving transistor of the pixel PX, and the driving transistor may be on-biased.

On the other hand, the third scan driver 400 may always supply the scan signals to the third scan lines S3 at a constant first frequency irrespective of a frequency of the image refresh rate of the display device 1000. Here, the first frequency may correspond to an output frequency of the third gate start pulse GSP3 supplied from the timing controller 800 to the third scan driver 400.

In addition, the first frequency at which the third scan driver 400 supplies the scan signal is greater than an image refresh rate. In one embodiment, a frequency (and the second frequency) of the image refresh rate may be set to a proper divisor of the first frequency. For example, the first frequency may be set to be about twice a maximum refresh rate (maximum driving frequency) of the display device 1000. When the maximum refresh rate of the display device 1000 is 120 Hz, the first frequency may be set to 240 Hz. Therefore, within one frame period, a scanning operation in which scan signals are sequentially output to the third scan lines S3 may be repeated a plurality of times at a certain period.

For example, at all driving frequencies at which the display device 1000 may be driven, the third scan driver 400 may perform scanning once during a display scan period and may perform scanning at least once during a self-scan period depending on an image refresh rate. That is, the scan signals may be sequentially output to the third scan lines S3 once during the display scan period and may be sequentially output to the third scan lines S3 at least once during the self-scan period.

In addition, when an image refresh rate is decreased, the number of times in which the third scan driver 400 supplies the scan signal to each of the third scan lines S3 may be increased within one frame period.

The first emission driver 500 supplies first emission control signals to first emission control lines E1 in response to the first emission start pulse ESP1.

In an example, the first emission driver 500 may sequentially supply the first emission control signals to the first emission control lines E1. When the first emission control signals are sequentially supplied to the first emission control lines E1, the pixels PX connected to the first emission control lines E1 do not emit light. To this end, the first emission control signal may be set to have a gate-off voltage (for example, a logic high level) so that some transistors (for example, p-type transistors) included in the pixels PX are turned off.

The second emission driver 600 supplies second emission control signals to second emission control lines E2 in response to the second emission start pulse ESP2. In an example, the second emission driver 600 may sequentially supply the second emission control signals to the second emission control lines E2. To this end, the second emission control signal may be set to have a gate-off voltage (for example, a logic high level H) so that p-type transistors which receive the second emission control signal included in the pixels PX are turned off.

In an exemplary embodiment, the second emission control signal supplied to the pixel PX may be a signal in which the first emission control signal is shifted by a certain horizontal period (for example, four horizontal periods). For example, the second emission control signal supplied to an i-th pixel row may have the same waveform as the first emission control signal supplied to the (i+5)-th pixel row (wherein i is a natural number). However, this is merely an example, and a length of the second emission control signal may be less than a length of the first emission control signal.

In an exemplary embodiment, like the third scan driver 400, the first emission driver 500 and the second emission driver 600 may supply the first emission control signal and the second emission control signal at the first frequency to the first emission control line E1 and the second emission control line E2. Therefore, within one frame period, the emission control signals may be supplied to the first emission control lines E1 and the second emission control lines E2 more than once.

Accordingly, when an image refresh rate is decreased, the number of times in which the first emission driver 500 and the second emission driver 600 supply the first emission control signal and the second emission control signal within one frame period may be increased.

The pixel unit 100 is connected to the data lines D, the scan lines S1, S2, and S3, and the emission control lines E1 and E2. The pixels PX may receive voltages of a first power source VDD, a second power source VSS, and an initialization power source Vint from the outside.

According to exemplary embodiments of the present inventive concept, the signal lines S1, S2, S3, E1, E2, and D connected to the pixel PX may be variously set depending on a circuit structure of the pixel PX.

Figure 2A:
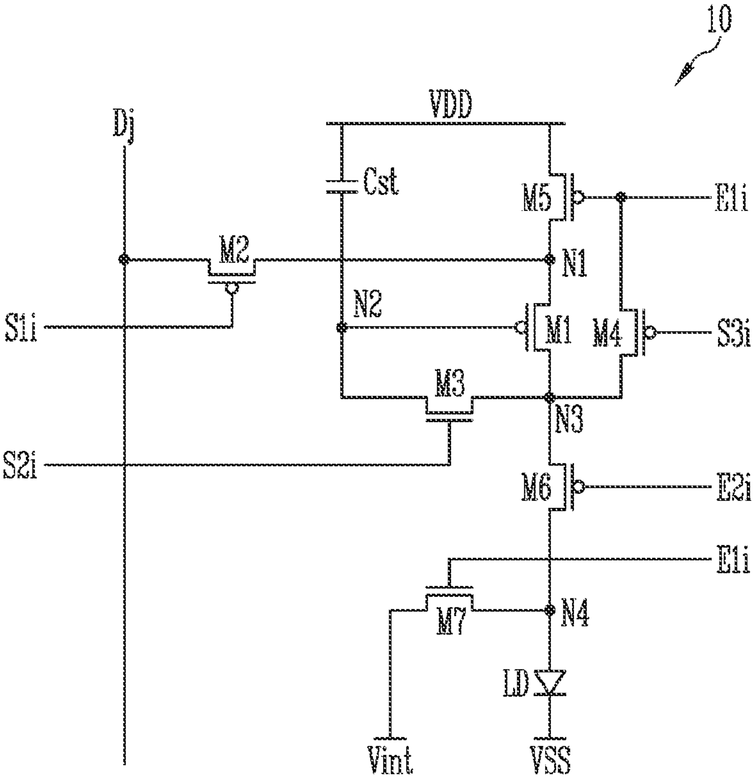
FIG. 2A is a circuit diagram illustrating an example of a pixel included in the display device of FIG. 1.

FIG. 2A is a circuit diagram illustrating an example of a pixel included in the display device of FIG. 1.

For convenience of description, FIG. 2A illustrates pixels positioned in an i-th horizontal line and connected to a jth data line Dj.

Referring to FIG. 2A, a pixel 10 may include a light-emitting element LD, first to seventh transistors M1 to M7, and a storage capacitor Cst.

A first electrode (anode electrode or cathode electrode) of the light-emitting element LD is connected to a fourth node N4, and a second electrode (cathode electrode or anode electrode) of the light-emitting element LD is connected to a second power source VSS. The light-emitting element LD generates light with certain luminance corresponding to an amount of a current supplied from the first transistor M1.

In an exemplary embodiment, the light-emitting element LD may be an organic light-emitting diode including an organic light-emitting layer. In another exemplary embodiment, the light-emitting element LD may be an organic light-emitting diode made of an organic material. Alternatively, the light-emitting element LD may have a form in which a plurality of inorganic light-emitting elements are connected in parallel and/or in series between the second power source VSS and the fourth node N4.

A first electrode of the first transistor M1 (or a driving transistor) is connected to a first node N1, and a second electrode of the first transistor M1 is connected to a third node N3. A gate electrode of the first transistor M1 is connected to a second node N2. The first transistor M1 may control an amount of a current flowing from a first power source VDD to the second power source VSS through the light-emitting element LD in response to a voltage of the second node N2. To this end, the first power source VDD may be set to have a higher voltage than that of the second power source VSS.

The second transistor M2 is connected between the data line Dj and the first node N1. A gate electrode of the second transistor M2 is connected to an i-th first scan line S1*i*. When a scan signal is supplied to the i-th first scan line S1*i*, the second transistor M2 is turned on to electrically connect the data line Dj and the first node N1.

The third transistor M3 is connected between the second electrode of the first transistor M1 (i.e., the third node N3) and the second node N2.

A gate electrode of the third transistor M3 is connected to an i-th second scan line S2*i*. When a scan signal is supplied to the i-th second scan line S2*i*, the third transistor M3 is turned on to electrically connect the second electrode of the first transistor M1 and the second node N2. Therefore, when the third transistor M3 is turned on, the first transistor M1 is connected in the form of a diode.

In an exemplary embodiment, in a state in which the second transistor M2 is turned off and the third transistor M3 is turned on, a voltage of an initialization power source Vint may be supplied to the gate electrode of the first transistor M1 through the third transistor.

The fourth transistor M4 (bias scan transistor) is connected between the third node N3 and an i-th first emission control line E1*i*. A gate electrode of the fourth transistor M4 is connected to an i-th third scan line S3*i*. When a scan signal is supplied to the i-th third scan line S3*i*, the fourth transistor M4 is turned on to supply a voltage of the i-th first emission control line E1*i* to the third node N3. In this case, a gate-off voltage (logic high level voltage) may be supplied to the i-th first emission control line E1*i*. For example, the gate-off voltage has a level of about 5 V to about 7 V.

Accordingly, by the fourth transistor M4 being turned on, a certain high voltage may be applied to the drain electrode (and the source electrode) of the first transistor M1, and the first transistor M1 may have an on-biased state (that is, be on-biased).

The fifth transistor M5 is connected between the first power source VDD and the first node N1. A gate electrode of the fifth transistor M5 is connected to the i-th first emission control line E1*i*. The fifth transistor M5 is turned off when an emission control signal is supplied to the i-th first emission control line Ei, and is turned on otherwise.

The sixth transistor M6 is connected between the second electrode of the first transistor M1 (that is, the third node N3) and the first electrode of the light-emitting element LD (that is, the fourth node N4). A gate electrode of the sixth transistor M6 is connected to an i-th second emission control line E2*i*. The sixth transistor M6 is turned off when an emission control signal is supplied to the i-th second emission control line E2*i*, and is turned on otherwise. Therefore, turn-on times of the fifth transistor M5 and the sixth transistor M6 may partially overlap each other.

The seventh transistor M7 is connected between the first electrode of the light-emitting element LD (that is, the fourth node N4) and the initialization power source Vint. A gate electrode of the seventh transistor M7 is connected to the i-th first emission control line E1*i*. When an emission control signal is supplied to the i-th first emission control line E1*i*, the seventh transistor M7 is turned on to supply the voltage of the initialization power source Vint to the first electrode of the light-emitting element LD. The seventh transistor M7 may be a transistor in a type opposite to that of the fifth transistor M5. Therefore, when the fifth transistor M5 is turned off, the seventh transistor M7 is turned on.

However, this is merely an example, and the gate electrode of the seventh transistor M7 may be connected to the i-th second emission control line E2*i*.

When the voltage of the initialization power source Vint is supplied to the first electrode of the light-emitting element LD, a parasitic capacitor of the light-emitting element LD may be discharged. As a residual voltage charged in the parasitic capacitor is discharged (removed), unintended micro light emission may be prevented. Therefore, black display capability of the pixel 10 may be improved.

In low frequency driving in which a length of one frame period is increased, when on-bias is applied to the first transistor M1 using a signal supplied from the data line Djm by turning on the second transistor M2, a hysteresis difference due to a grayscale level difference between adjacent pixels may be severely generated. Thus, an afterimage phenomenon (ghost phenomenon) may be visible due to a difference between threshold voltage shift amounts of the driving transistors of adjacent pixels.

In the display device according to exemplary embodiments of the present inventive concept, by using the fourth transistor M4, a voltage for on-biasing the driving transistor may be applied to a drain electrode (and/or a source electrode) of the driving transistor at a constant voltage. Therefore, a hysteresis deviation due to a grayscale level difference between adjacent pixels may be removed, and thus an afterimage phenomenon may be reduced (removed).

The storage capacitor Cst is connected between the first power source VDD and the second node N2. The storage capacitor Cst may store a voltage applied to the second node N2.

Meanwhile, the first transistor M1, the second transistor M2, the fourth transistor M4, the fifth transistor M5, and the sixth transistor M6 may be formed as a polysilicon semiconductor transistor. For example, the first transistor M1, the second transistor M2, the fourth transistor M4, the fifth transistor M5, and the sixth transistor M6 may include a polysilicon semiconductor layer as an active layer (channel), which is formed through a low temperature poly-silicon process (LTPS). Meanwhile, the first transistor M1, the second transistor M2, the fourth transistor M4, the fifth transistor M5, and the sixth transistor M6 may be p-type transistors. Accordingly, a gate-on voltage for turning on the first transistor M1, the second transistor M2, the fourth transistor M4, the fifth transistor M5, and the sixth transistor M6 may have a logic low level.

Since the polysilicon semiconductor transistor has a fast response speed, the polysilicon semiconductor transistor may be applied to switching elements which require fast switching.

The third and seventh transistors M3 and M7 may be formed as oxide semiconductor transistors. For example, the third and seventh transistors M3 and M7 may be n-type oxide semiconductor transistors and may include an oxide semiconductor layer as an active layer. Accordingly, a gate-on voltage for turning on the third and seventh transistors M3 and M7 may have a logic high level.

A low temperature process may be performed on an oxide semiconductor transistor, and the oxide semiconductor transistor has low charge mobility as compared with a polysilicon semiconductor transistor. That is, the oxide semiconductor transistor has excellent off-current characteristics. Therefore, when the third transistor M3 and the seventh transistor M7 are formed as the oxide semiconductor transistors, a leakage current from the second node N2 may be minimized, thereby improving display quality.

Figure 2B:
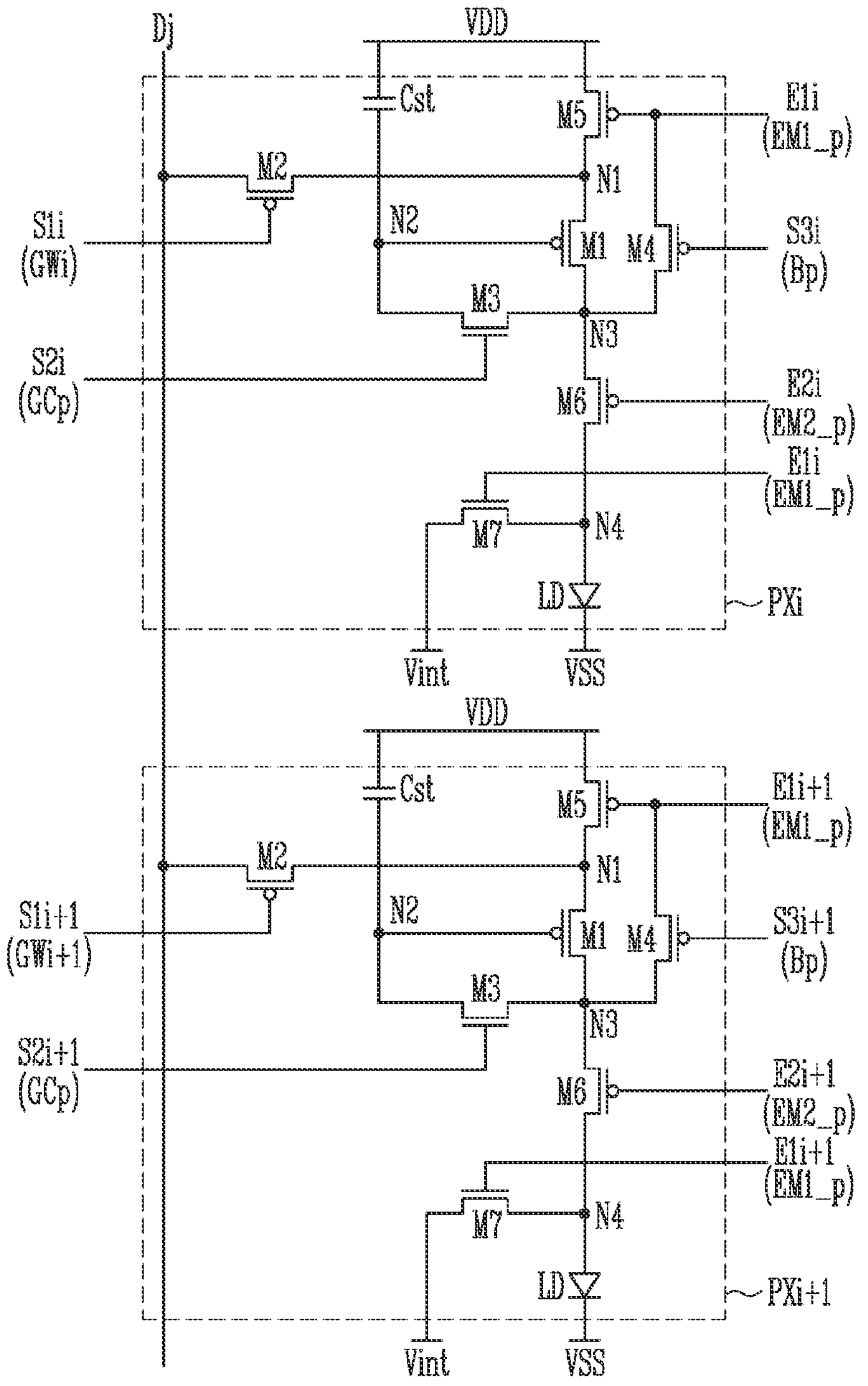
FIG. 2B is a circuit diagram illustrating an example of a connection relationship of the pixel of FIG. 2A.
Figure 2C:
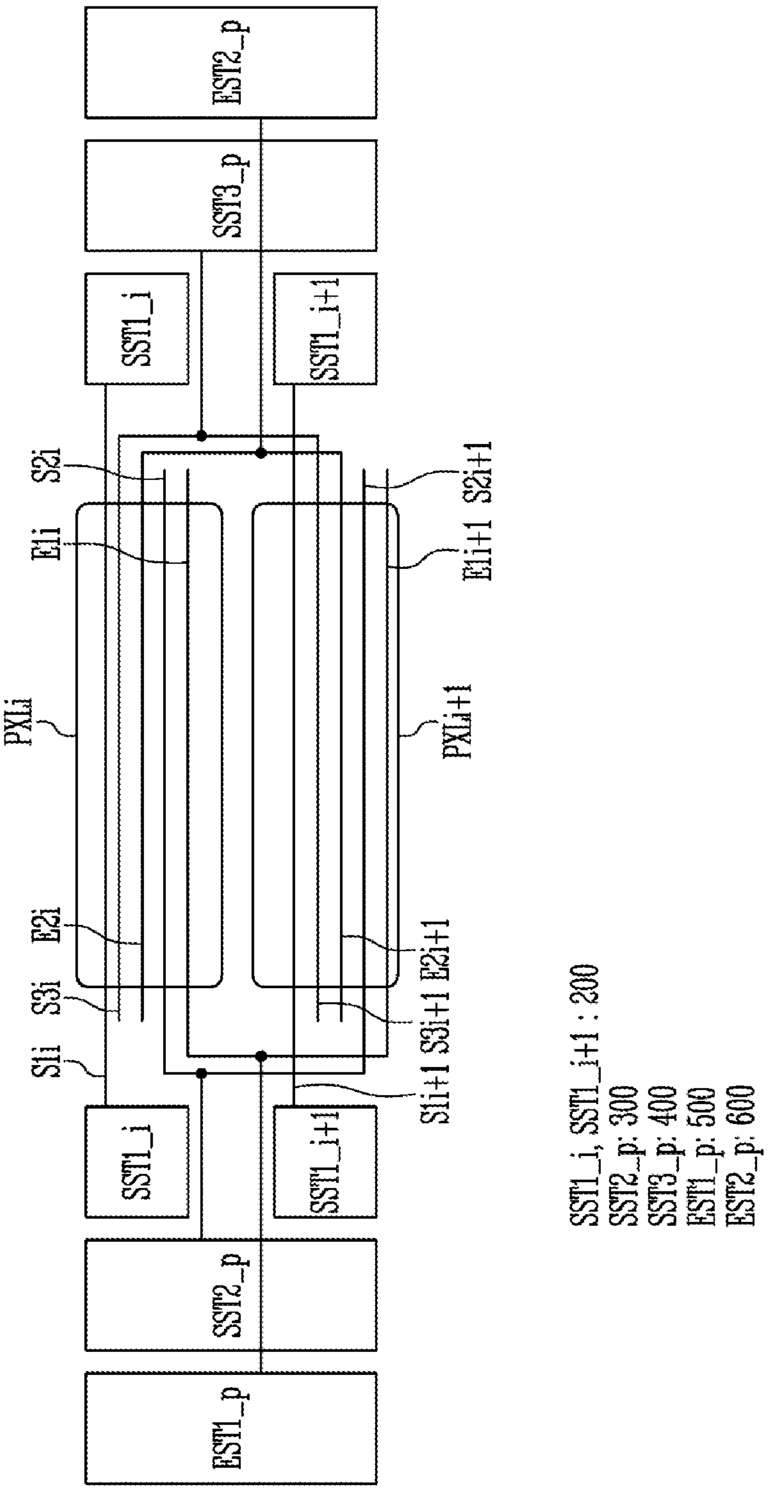
FIG. 2C is a conceptual diagram illustrating scan signals and emission control signals supplied to the pixel of FIG. 2B.

FIG. 2B is a circuit diagram illustrating an example of a connection relationship of the pixel of FIG. 2A, and FIG. 2C is a conceptual diagram illustrating scan signals and emission control signals supplied to the pixel of FIG. 2B.

Referring to FIGS. 1 to 2C, an i-th pixel PXi positioned in an i-th pixel row (ith horizontal line) may have substantially the same pixel structure as an (i+1)-th pixel PXi+1 positioned in an (i+1)-th pixel row ((i+1)-th horizontal line).

The i-th pixel PXi and the (i+1)-th pixel PXi+1 will be described on the assumption that the i-th pixel PXi and the (i+1)-th pixel PXi+1 are connected to a jth data line Dj.

An i-th writing scan signal GWi may be supplied to a i-th first scan line S1*i*, and an (i+1)-th writing scan signal GWi+1 may be supplied to an (i+1)-th first scan line S1*i*+1. The (i+1)-th writing scan signal GWi+1 may be a scan signal in which the i-th writing scan signal GWi is shifted (delayed) by one horizontal period (1H).

A pth compensation scan signal GCp may be commonly supplied to an i-th second scan line S2*i* and an (i+1)-th second scan line S2*i*+1 (wherein p is a natural number). That is, the i-th pixel PXi and the (i+1)-th pixel PXi+1 may be commonly controlled by the same compensation scan signal GCp.

A pth bias scan signal Bp may be commonly supplied to an i-th third scan line S3*i* and an (i+1)-th third scan line S3*i*+1. That is, the i-th pixel PXi and the (i+1)-th pixel PXi+1 may be commonly controlled by the same bias scan signal Bp.

A pth first emission control signal EM1_*p* may be commonly supplied to an i-th first emission control line E1*i* and an (i+1)-th first emission control line E1*i*+1. That is, the i-th pixel PXi and the (i+1)-th pixel PXi+1 may be commonly controlled by the same first emission control signal EM1_*p*.

A pth second emission control signal EM2_*p* may be commonly supplied to an i-th second emission control line E2*i* and an (i+1)-th second emission control line E2*i*+1. That is, the i-th pixel PXi and the (i+1)-th pixel PXi+1 may be commonly controlled by the same emission control signal EM2_*p*.

In other words, each of the first scan lines may be connected to respective pixels in one pixel row and control the pixels in the one pixel row, and the second scan lines, the third scan lines, the first emission control lines, and the second emission control lines may be commonly connected to respective pixels in two pixel rows adjacent to each other and control the pixels in two consecutive pixel rows. Accordingly, high speed driving of the display device 1000 having a driving frequency exceeding 60 Hz may be easily implemented.

In an exemplary embodiment, the scan drivers 200, 300, and 400 and the emission drivers 500 and 600 may have an output configuration as shown in FIG. 2C.

An i-th first scan stage SST1_*i* included in the first scan driver 200 may be connected to an i-th pixel row PXLi through the i-th first scan line S1*i*. An (i+1)-th first scan stage SST1_*i*+1 may be connected to an (i+1)-th pixel row PXLi+1 through the (i+1)-th first scan line S1*i*+1. According to exemplary embodiments, the first scan driver 200 may be disposed at both sides of the pixel unit 100.

A pth second scan stage SST2_*p* included in the second scan driver 300 is connected to the i-th second scan line S2*i* and the (i+1)-th second scan line S2*i*+1. The pth second scan stage SST2_*p* may concurrently supply a pth compensation scan signal GCp to the i-th pixel row PXLi and the (i+1)-th pixel row PXLi+1 through the i-th second scan line S2*i* and the (i+1)-th second scan line S2*i*+1.

A pth third scan stage SST3_*p* included in the third scan driver 400 is connected to an i-th third scan line S3*i* and an (i+1)-th third scan line S3*i*+1. The pth third scan stage SST3_*p* may concurrently supply a pth bias scan signal Bp to the i-th pixel row PXLi and the (i+1)-th pixel row PXLi+1 through the i-th third scan line S3*i* and the (i+1)-th third scan line S3*i*+1.

A pth first emission stage EST1_*p* included in the first emission driver 500 is connected to an i-th first emission control line E1*i* and an (i+1)-th first emission control line E1*i*+1. The pth first emission stage EST1_*p* may concurrently supply a pth first emission control signal EM1_*p* to the i-th pixel row PXLi and the (i+1)-th pixel row PXLi+1 through the i-th first emission control line E1*i* and the (i+1)-th first emission control line E1*i*+1.

A pth second emission stage EST2_*p* included in the second emission driver 600 is connected to an i-th second emission control line E2*i* and an (i+1)-th second emission control line E2*i*+1. The pth second emission stage EST2_*p* may concurrently supply a pth second emission control signal EM2_*p* to the i-th pixel row PXLi and the (i+1)-th pixel row PXLi+1 through the i-th second emission control line E2*i* and the (i+1)-th second emission control line E2*i*+1.

Accordingly, the second scan driver 300 and the third scan driver 400 may include fewer stage circuits as compared to the first scan driver 200. Similarly, the first emission drivers 500 and the second emission driver 600 may also include fewer stage circuits as compared to the first scan driver 200.

Figure 3A:
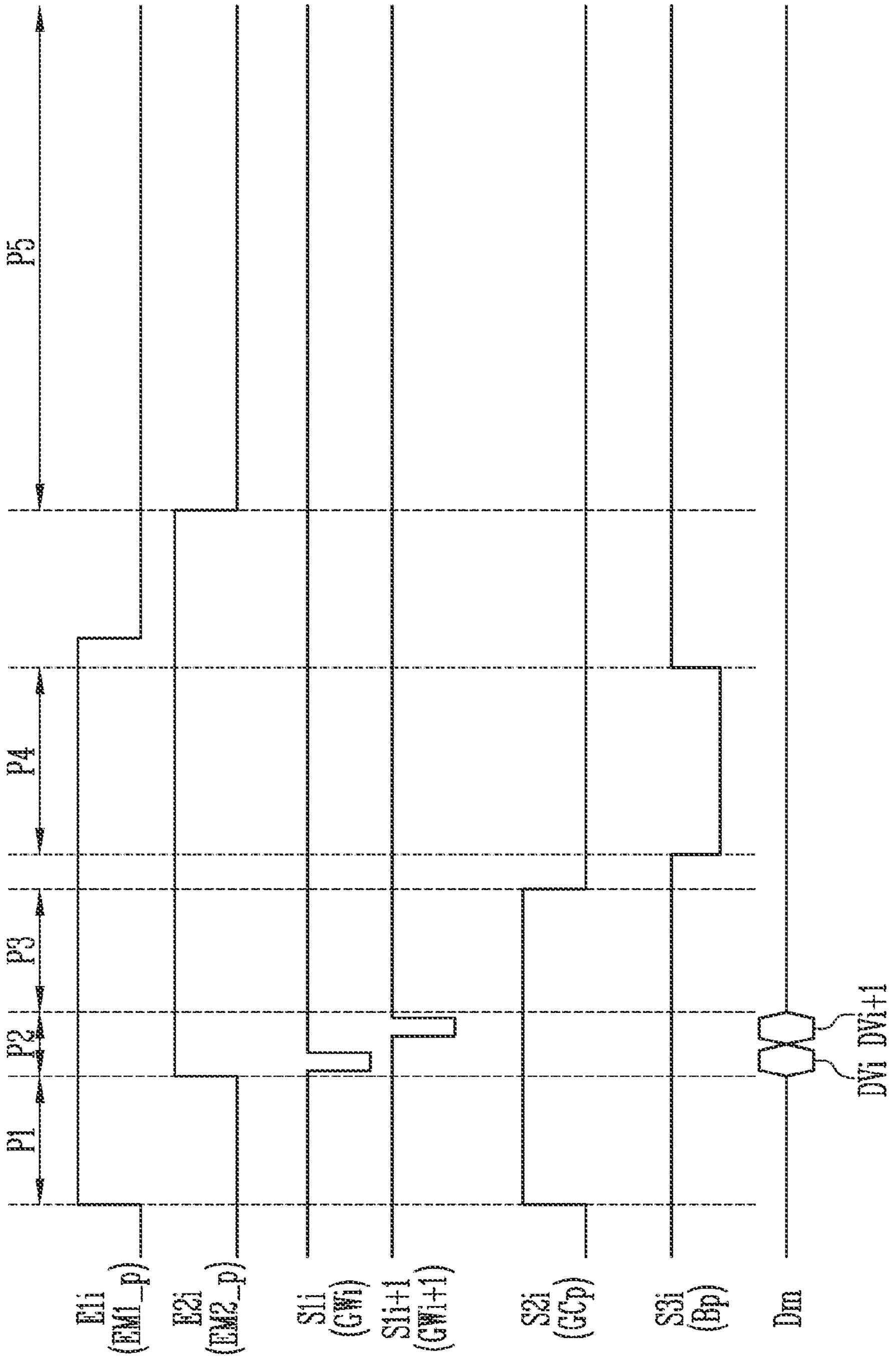
FIG. 3A is a timing diagram illustrating an example of driving of the pixel of FIG. 2B.

FIG. 3A is a timing diagram illustrating an example of driving of the pixel of FIG. 2B.

Referring to FIGS. 2B and 3A, the pixels PXi and PXi+1 may receive signals for displaying an image during a display scan period. The display scan period may include a period in which a data signal Dm corresponding to an output image is written.

Hereinafter, for convenience of description, the i-th emission control lines E1*i* and E2*i* may be a first emission control line E1$i$ and a second emission control line E2$i$, respectively. The i-th scan lines S1$i$, S2$i$, and S3$i$ may be a first scan line S1$i$, a second scan line S2$i$, and a third scan line S3$i$, respectively.

First, the first emission control signal EM1_$p$ is supplied to the first emission control line E1$i$, and the compensation scan signal GCp is supplied to the second scan line S2$i$. The first emission control signal EM1_$p$ may be maintained from a first period P1 to a fourth period P4. The compensation scan signal GCp may be maintained from the first period P1 to a third period P3.

In the first period P1, the fifth transistor M5 is turned off and the seventh transistor M7 is turned on by the first emission control signal EM1_$p$ having a logic high level H. In addition, the third transistor M3 is turned on by the compensation scan signal GCp having a logic high level H. Since the third transistor M3, the sixth transistor M6 and the seventh transistor M7 maintains a turn-on state in the first period P1, the voltage of the initialization power source Vint may be supplied to the first electrode of the light-emitting element LD (fourth node N4) and the gate electrode of the first transistor M1 (second node N2).

Therefore, in the first period P1, initialization of the light-emitting element LD and the first transistor M1 may be performed.

Meanwhile, the seventh transistor M7 may maintain a turn-on state until the fourth period P4 by the first emission control signal EM1_$p$ having a logic high level H. Therefore, the voltage of the initialization power source Vint may be supplied to the fourth node N4 until the fourth period P4.

In a second period P2, the second emission control signal EM2_$p$ having a logic high level H is supplied to the second emission control line E2$i$. In an exemplary embodiment, the supply of the second emission control signal EM2_$p$ may be stopped before the start of the fifth period P5. The sixth transistor M6 is turned off by the second emission control signal EM2_$p$ having a logic high level H.

In addition, in the second period P2, the writing scan signals GWi and GWi+1 may be sequentially supplied to the first scan lines S1$i$ and S1$i$+1. Accordingly, the second transistor M2 may be turned on so that an i-th data signal DVi and an (i+1)-th data signal DVi+1 may be respectively supplied to the i-th pixel PXi and the (i+1)-th pixel PXi+1.

Since the second transistor M2 is turned on in a state in which the third transistor M3 is turned on, the first transistor M1 is diode connected. That is, the second period P2 may be a data writing and threshold voltage compensation period.

In the third period P3, the second transistor M2 is turned off, and the third transistor M3 maintains a turn-on state. In the third period P3, the first transistor M1 is diode connected because the third transistor M3 is turned on by the compensation scan signal GCp having a logic high level H. Therefore, the third period P3 is a threshold voltage compensation period, and a sufficient time for compensating for a threshold voltage compensation in high speed driving may be secured.

Thereafter, when the supply of the compensation scan signal GCp to the second scan line S2$i$ is stopped, the third transistor M3 may be turned off.

In the fourth period P4, the bias scan signal Bp may be supplied to the third scan line S3$i$. The fourth transistor M4 may be turned on by the bias scan signal Bp having a logic low level L. When the fourth transistor M4 is turned on, a gate-off voltage (a logical high level H) of the first emission control signal EM1_$p$ may be supplied to the third node N3. The gate-off voltage of the first emission control signal EM1_$p$ may be in a range of about 5 V to about 7 V, and the first transistor M1 may be on-biased in the fourth period P4.

Meanwhile, in the fourth period P4, since the first transistors M1 of all the pixels disposed in the i-th pixel row are on-biased by the first emission control signal EM1_$p$ having a logic high level H, a bias deviation (difference) may be removed. Thus, a hysteresis difference of the pixels may be removed (reduced).

Thereafter, the bias scan signal Bp having a logic high level H, the first emission control signal EM1_$p$ having a logic low level L, and the second emission control signal EM2_$p$ having a logic low level L may be supplied to the M4, M5 and M6, respectively. Therefore, the fourth transistor M4 and the seventh transistor M7 may be turned off, and the fifth and sixth transistors M5 and M6 may be turned on.

In addition, a turn-on period of the third transistor M3 and a turn-on period of the fourth transistor M4 do not overlap each other. That is, an initialization/compensation period and a bias period of the first transistor M1 are separated from each other.

In a fifth period P5, the fifth transistor M5 and the sixth transistor M6 are turned on and the first transistor M1 controls a driving current that flows through the light-emitting element LD in response to a voltage of the second node N2. Then, the light-emitting element LD generates light with luminance corresponding to an amount of a current flowing through the light-emitting element LD. The fifth period P5 may be an emission period. Meanwhile, the first to fourth periods P1 to P4 may be non-emission periods.

Such an operation of the display scan period may be implemented by the scan signals supplied to the first scan line S1$i$ and the second scan line S2$i$ and may be synchronized to frequencies of the first scan driver 200 and the second scan driver 300.

For convenience of description, one scan signal is illustrated in FIG. 3A as being supplied to each of the scan lines S1, S2, and S3 during the first period, but the present inventive concept is not limited thereto. For example, a plurality of scan signals may be supplied to each of the scan lines S1, S2, and S3. In this case, an actual operation process is the same as that of FIG. 3A, and thus, detailed descriptions thereof will be omitted.

Figure 3B:
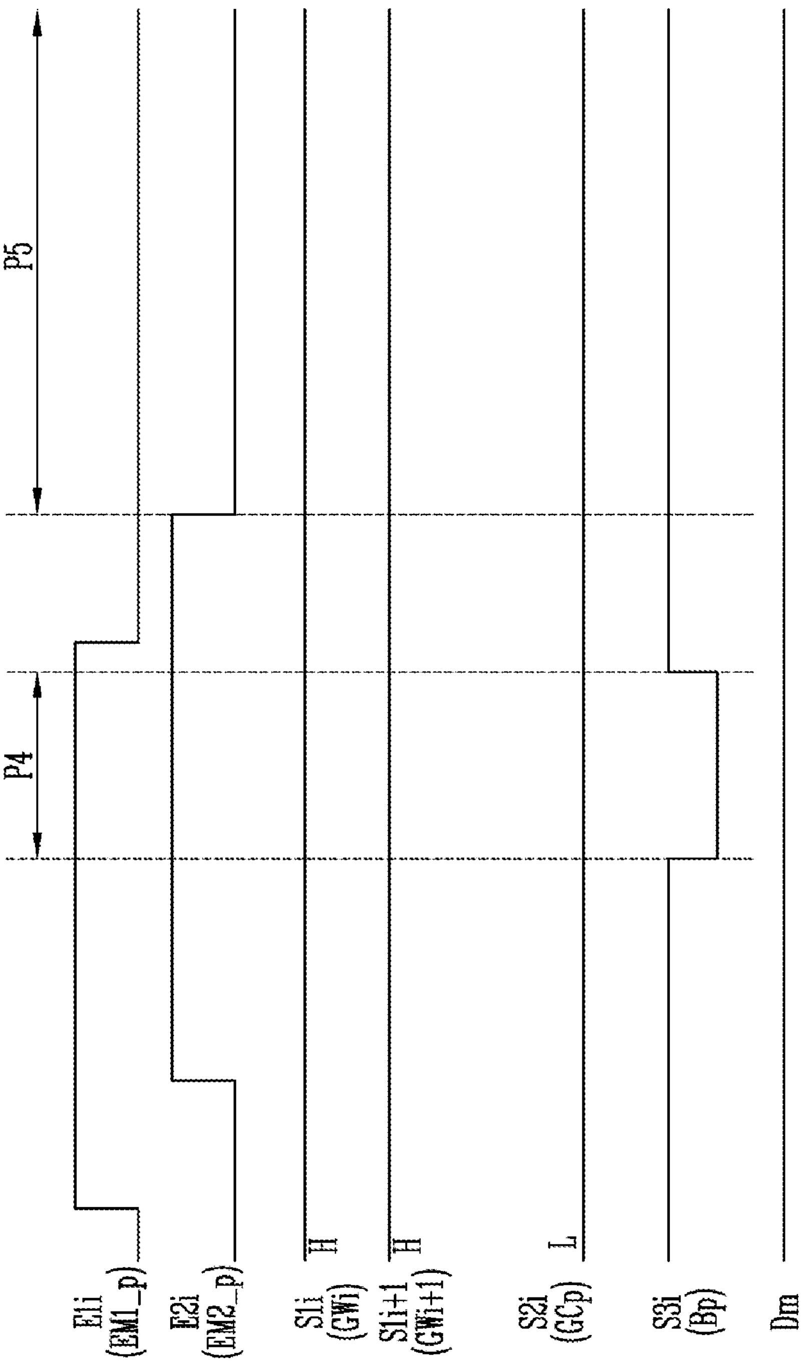
FIG. 3B is a timing diagram illustrating an example of driving of the pixel of FIG. 2B.

FIG. 3B is a timing diagram of a self-scan period illustrating an example of driving of the pixel of FIG. 2B.

Referring to FIGS. 2B and 3B, in order to maintain luminance of an image output in a display scan period, the gate-off voltage of the first emission control signal EM1_$p$ may be applied to one electrode of the first transistor M1 (for example, the drain electrode or the third node N3) in a self-scan period.

One frame may include at least one self-scan period according to an image frame rate. The self-scan period includes a bias application period and an emission period. An operation of the self-scan period is substantially the same as the operation of the display scan period except for the supply of a writing scan signal and a compensation scan signal.

In an exemplary, a scan signal is not supplied to the second transistor M2 and the third transistor M3 in the self-scan period. For example, in the self-scan period, the writing scan signals GWi and GWi+1 and the compensation scan signal GCp supplied to the first scan line S1$i$ and the second scan line S2$i$ may each have a gate-off voltage.

For example, the writing scan signals GWi and GWi+1 for controlling a p-type transistor may be supplied at a logic high level H, and the compensation scan signal GCp for controlling an n-type transistor may be supplied at a logic low level L. Thus, the self-scan period does not include an initialization period (first period P1 of FIG. 3A) and a writing period (second period P2) and a compensation period (third periods P3 of FIG. 3A).

Since the third and fourth transistors M3 and M4 maintain a turn-off state, a gate voltage of the first transistor M1 (that is, the second node N2) is affected by the driving of the self-scan period.

The bias scan signal Bp may be supplied to the third scan line S3*i* in a fourth period P4 of non-emission periods. The fourth transistor M4 may be turned on by the bias scan signal Bp having a logic low level L. When the fourth transistor M4 is turned on, a gate-off voltage (logical high level) of the first emission control signal EM1_*p* may be supplied to the third node N3. Accordingly, since on-bias is applied to the first transistor M1 in the fourth period P4, flicker in low frequency driving may be reduced.

The bias scan signal Bp and the emission control signals EM1_*p* and EM2_*p* are supplied at a first frequency irrespective of an image refresh rate. Therefore, even when the image refresh rate is changed, an application of the bias scan signal having a logic low level L during the fourth period P4 may not affected by the changed refresh rate but is applied periodically. Thus, flicker may be reduced even when various image refresh rates (in particular, low frequency driving) is used.

Thereafter, the bias scan signal Bp may be changed to a logic high level H to turn off the fourth transistor M4 and the first emission control signal EM1_*p* and the second emission control signal EM2_*p* may be changed to a logic low level L to turn on the fifth transistor M5 and the sixth transistor M6.

In an exemplary embodiment, the data driver 700 may not supply the data signal Dm to the pixel unit 100 in the self-scan period. Thus, power consumption may be further reduced.

Figure 4:
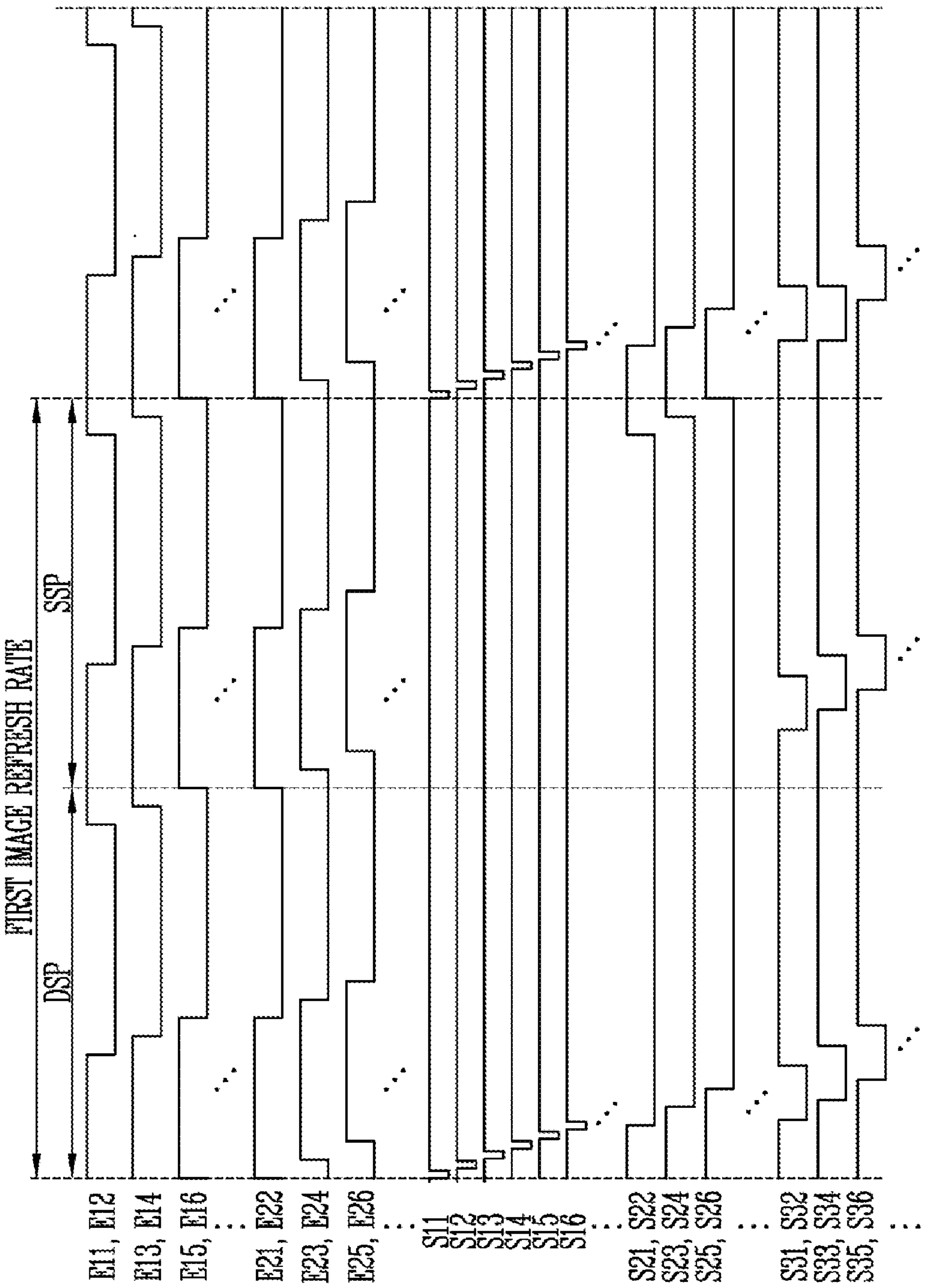
FIG. 4 is a timing diagram illustrating an example of a driving method when the display device of FIG. 1 is driven at a first image refresh rate.

FIG. 4 is a timing diagram illustrating an example of a driving method when the display device of FIG. 1 is driven at a first image refresh rate.

Here, the first image refresh rate may be a maximum refresh rate that is implementable by the display device 1000. For example, the first image refresh rate may be set to a high frequency of 120 Hz or more. In addition, the first image refresh rate may be understood as a period in which a data signal is supplied to the data lines D, and one frame period may correspond to the first image refresh rate.

Referring to FIGS. 1 and 4, when the display device 1000 is driven at the first image refresh rate, one frame period may include a display scan period DSP and one self-scan period SSP.

In an exemplary embodiment, when the display device 1000 is driven at the first image refresh rate, lengths of the display scan period DSP and the self-scan period SSP may be substantially the same.

In an exemplary embodiment, the third scan driver 400 may sequentially supply scan signals (bias scan signals) to third scan lines S31 to S36 at the first frequency. The emission driver 500 may sequentially supply first emission control signals to first emission control lines E11 to E16 at the first frequency. The second emission driver 600 may sequentially supply second emission control signals to second emission control lines E21 to E26 at the first frequency. Here, the first frequency may be twice the first image refresh rate (that is, a maximum refresh rate).

The first scan driver 200 may sequentially supply scan signals (writing scan signals) to the first scan lines S11 to S16 at a second frequency that is the same as the first image refresh rate. The second scan driver 300 may sequentially supply scan signals (compensation scan signals) to the second scan lines S21 to S26 at the second frequency.

In an exemplary embodiment, in the display scan period DSP, a first emission control signal supplied to an i-th pixel row (ith horizontal line) may overlap a writing scan signal, a compensation scan signal, and a bias scan signal which are supplied to the i-th pixel row (ith horizontal line). In addition, in the display scan period DSP, a second emission control signal supplied to the i-th pixel row (ith horizontal line) may completely overlap the writing scan signal and the compensation scan signal which are supplied to the i-th pixel row (ith horizontal line). However, the second emission control signal may partially overlap a portion of the compensation scan signal.

In the display scan period DSP, the compensation scan signal supplied to the i-th pixel row (ith horizontal line) may overlap the writing scan signal supplied to the i-th pixel row (ith horizontal line). However, the compensation scan signal supplied to the i-th pixel row (ith horizontal line) does not overlap the bias scan signal supplied to the i-th pixel row (ith horizontal line).

In the self-scan period SSP, scan signals are not supplied to the first scan lines S11 to S16 and the second scan lines S21 to S26. In the self-scan period SSP, only a bias application and light emission of the first transistor M1 may be performed. Accordingly, power consumption may be reduced.

As described with reference to FIG. 3A, a voltage of the data signal Dm is stored in each of the pixels PX during the display scan period DSP, and the pixels PX may emit light based on the voltage of the data signal Dm which is stored in each of the pixels PX.

In addition, as described with reference to FIG. 3B, during the self-scan period SSP, a substantially uniform voltage may be applied to the first transistors M1 by the bias scan signal supplied to each of the third scan lines S31 to S36. Accordingly, a hysteresis difference of the first transistors M1 in a frame period may be reduced.

Meanwhile, the first frequency, which is an output frequency of the third scan driver 400 and the emission drivers 500 and 600, is set to be greater than the image refresh rate of the display device 1000, thereby image output at various refresh rates may reduce flicker in various image refresh rate driving and improving display quality. For example, the image refresh rate (driving frequency) of the display device 1000 may include frequencies that are a proper divisor of the first frequency.

Figure 5:
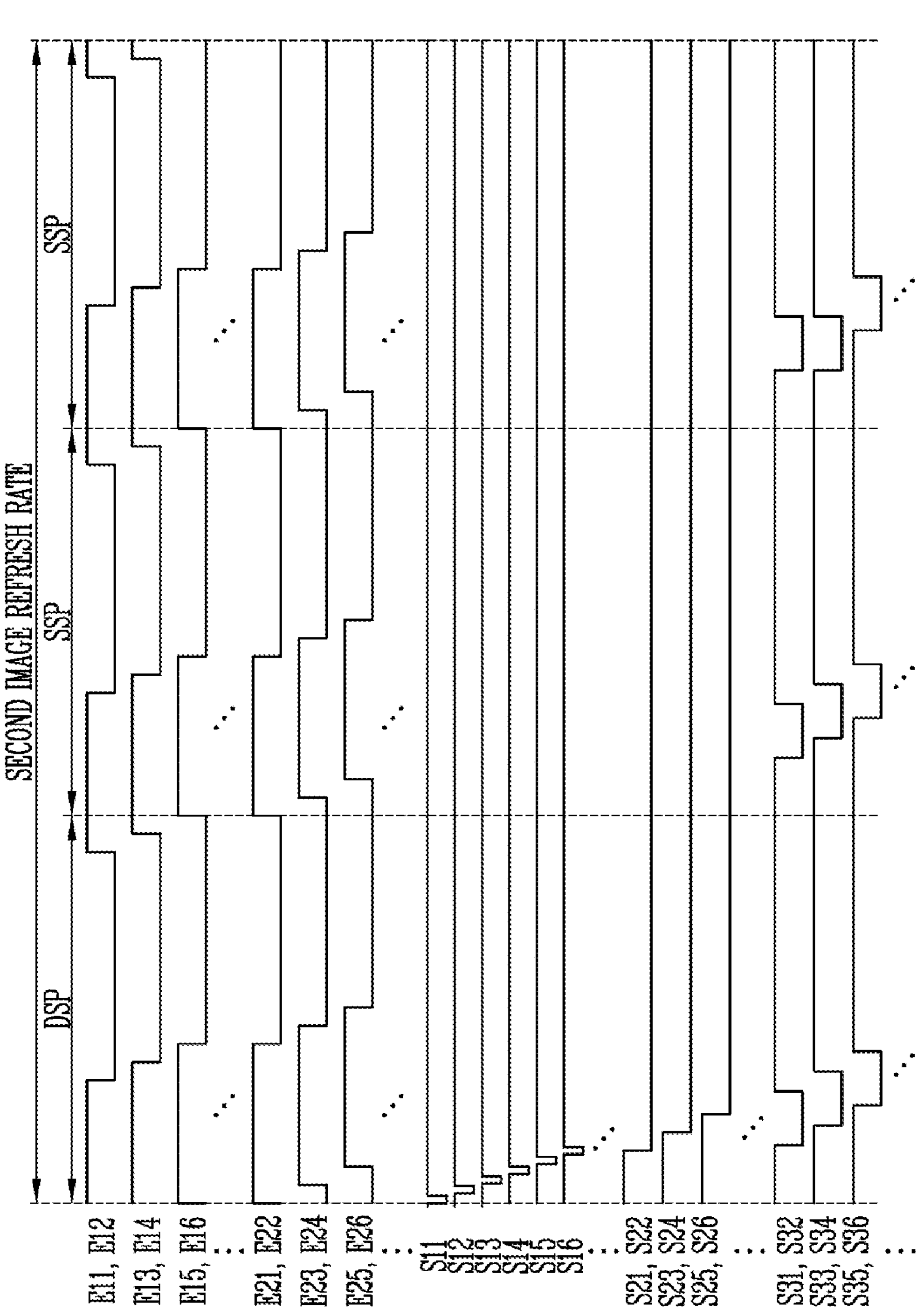
FIG. 5 is a timing diagram illustrating an example of a driving method when the display device of FIG. 1 is driven at a second image refresh rate.

FIG. 5 is a timing diagram illustrating an example of a driving method when the display device of FIG. 1 is driven at a second image refresh rate.

Referring to FIGS. 1, 4, and 5, when the display device 1000 is driven at the first image refresh rate, one frame period may include a display scan period DSP and a plurality of self-scan periods SSP.

Here, the first frequency may be set to about 240 Hz, and the second refresh rate may be set to a frequency less than 100 Hz. For example, FIG. 5 illustrates an example in which the second refresh rate is set to 80 Hz.

In an exemplary embodiment, the third scan driver 400 and the emission drivers 500 and 600 may drive each of the third scan lines S31 to S36 and the emission control lines E11 to 16 and E21 to E26 at a constant first frequency irrespective of the image refresh rate of the display device 1000.

The first scan driver 200 and the second scan driver 300 may drive the second scan lines S21 to S26 and the third scan lines S31 to S36 at the second frequency that is substantially the same as the second image refresh rate.

In an exemplary embodiment, when the second refresh rate is set to 80 Hz, the self-scan period SSP may be repeated twice. On-bias may be applied periodically (that, at the first frequency) to the first transistor M1 of each pixel PX. For example, On-bias being applied to the first transistor M1 may mean that the first transistor M1 is in an on-bias state. Accordingly, hysteresis characteristics of the first transistor M1 in a frame period may be improved in response to various driving frequencies.

Figure 6A:
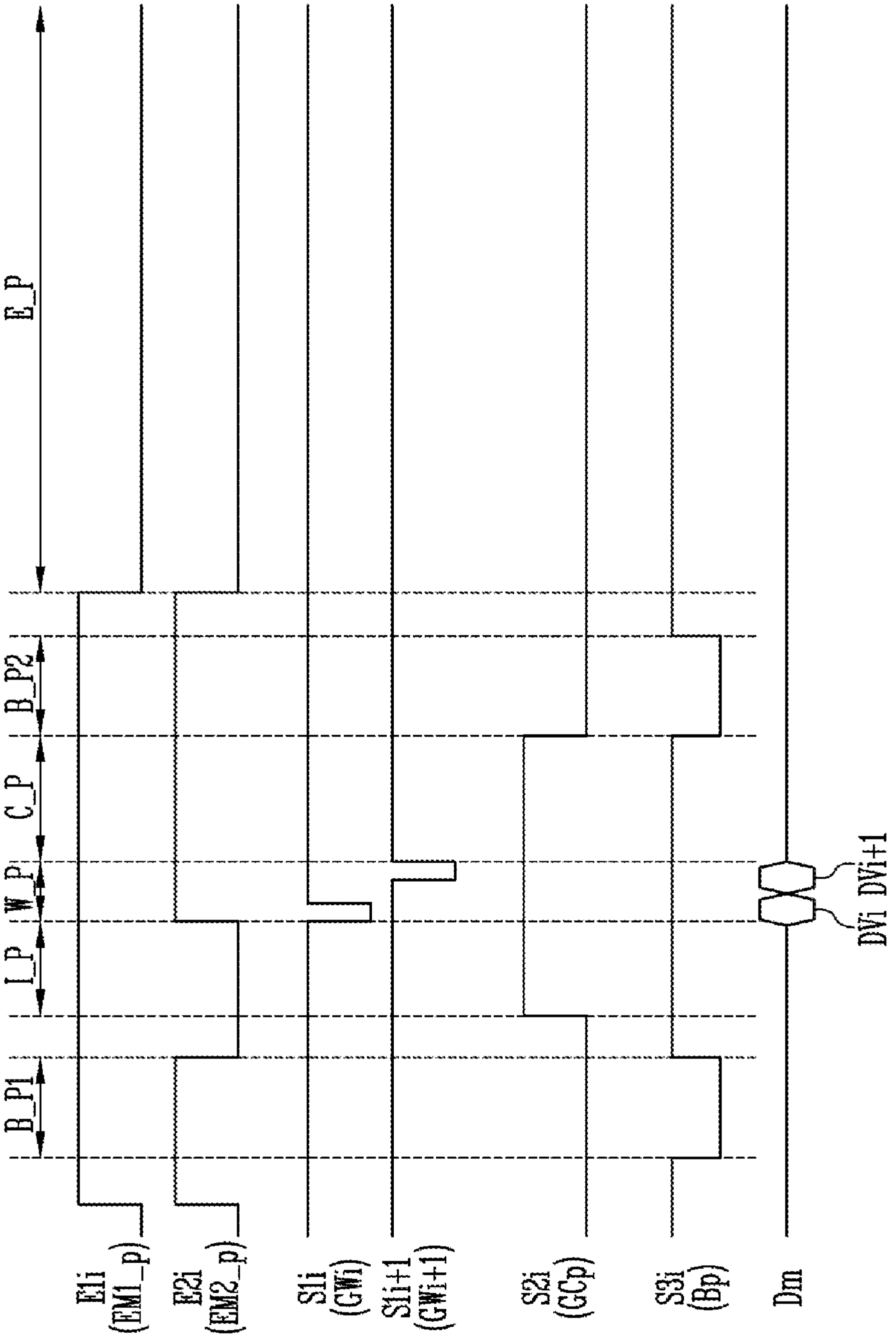
FIG. 6A is a timing diagram illustrating an example of driving of the pixel of FIG. 2B.
Figure 6B:
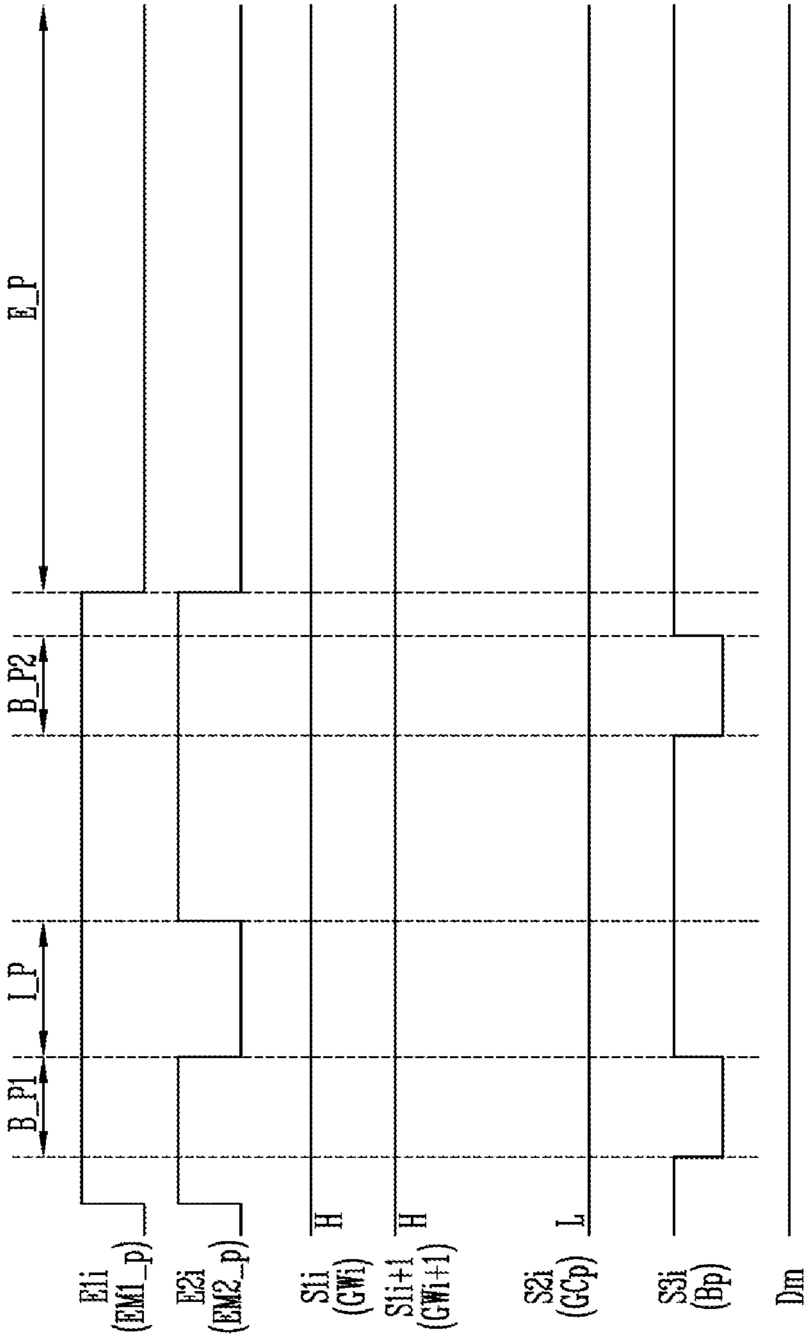
FIG. 6B is a timing diagram illustrating another example of driving of the pixel of FIG. 2B.

FIG. 6A is a timing diagram illustrating an example of driving of the pixel of FIG. 2B, and FIG. 6B is a timing diagram illustrating another example of driving of the pixel of FIG. 2B.

Since the driving of FIGS. 6A and 6B is the same as the pixel operation of FIGS. 3A and 3B except for a timing of supplying a second emission control signal E2*i* and a bias scan signal Bp, the same reference numerals will be used to refer to the same or corresponding components, and redundant descriptions will be omitted.

FIG. 6A illustrates an operation of a display scan period, and FIG. 6B illustrates an operation of a self-scan period.

Referring to FIGS. 2B, 6A, and 6B, on-bias may be applied to the first transistor M1 twice in the display scan period or the self-scan period.

As shown in FIG. 6A, a non-emission period of the display scan period (DSP of FIG. 4) may include a first bias period B_P1, an initialization period I_P, a writing period W_P, a compensation period C_P, and a second bias period B_P2. In an exemplary embodiment, the first bias period B_P1 may occur before the initialization period I_P. In addition, the second bias period B_P2 may occur after the compensation period C_P.

Operations of the first and second bias periods B_P1 and B_P2 may be the same as the operation of the fourth period P4 of FIG. 3A. An operation of the initialization period I_P may be the same as the operation of the first period P1 of FIG. 3A. An operation of the writing period W_P may be the same as the operation of the second period P2 of FIG. 3A. An operation of the compensation period C_P may be the same as the operation of the third period P3 of FIG. 3A.

As shown in FIG. 6B, a non-emission period of the self-scan period (SSP of FIG. 4) may include a first bias period B_P1, an initialization period I_P, and a second bias period B_P2. In the self-scan period, writing scan signals GWi and GWi+1 and a compensation scan signal GCp are not toggled. Thus, power consumption of the display device 1000 may be reduced.

As described above, the number of applying times of bias to the first transistor M1 is increased in each of the display scan period and the self-scan period, thereby reducing flicker in various image refresh rate driving and improving display quality.

FIGS. 7A to 7D are timing diagrams illustrating examples of gate start pulses supplied to an emission driver and a scan driver included in a display device according to an image refresh rate. FIG. 8 is a conceptual diagram illustrating an example of a driving method of a display device according to an image refresh rate.

Referring to FIGS. 7A to 7D and 8, output frequencies of a first gate start pulses GSP1 and a second gate start pulse GSP2 may be changed according to an image refresh rate RR.

In an exemplary embodiment, pulse widths of the first emission start pulse ESP1 and the second emission start pulse ESP2 may be greater than pulse widths of the first gate start pulse GSP1, the second gate start pulses GSP2 and the third gate start pulse GSP3.

In an exemplary embodiment, irrespective of a driving frequency, the timing controller 800 may output the first emission start pulse ESP1, the second emission start pulse ESP2, and the third gate start pulse GSP3 at a constant frequency (first frequency; 240 Hz). For example, output frequencies of the first emission start pulse ESP1, the second emission start pulse ESP2, and the third gate start pulse GSP3 may be set to be twice a maximum refresh rate of the display device 1000.

The timing controller 800 may output the first gate start pulse GSP1 and the second gate start pulse GSP2 at the same frequency (second frequency 120 Hz which is less than the first frequency) as the image refresh rate RR. One frame period of the display device may be determined by output periods of the first gate start pulse GSP1 and the second gate start pulse GSP2.

In an exemplary embodiment, in a display scan period DSP, the first emission start pulse ESP1, the second emission start pulse ESP2, the first gate start pulse GSP1, the second gate start pulse GSP2, and the third gate start pulse GSP3 may all be output. For example, each of the pixels PXs may perform driving of FIG. 3A or 6A during the display scan period DSP. Each of the pixels PX may store data signals corresponding to an image to be displayed in the display scan period DSP.

In an exemplary embodiment, in a self-scan period SSP, the first emission start pulse ESP1, the second emission start pulse ESP2, and the third gate start pulse GSP3 may be output. For example, each of the pixels PXs may perform driving of FIG. 3B or 6B during the self-scan period SSP. In the self-scan period SSP, a certain high voltage may be supplied to the first electrode and/or the second electrode of the first transistor M1 of each of the pixels PX.

In an exemplary embodiment, lengths of the display scan period DSP and the self-scan period SSP may be substantially the same. However, the number of self-scan periods SSPs included in one frame period may be determined according to the image refresh rate RR.

Figure 7A:
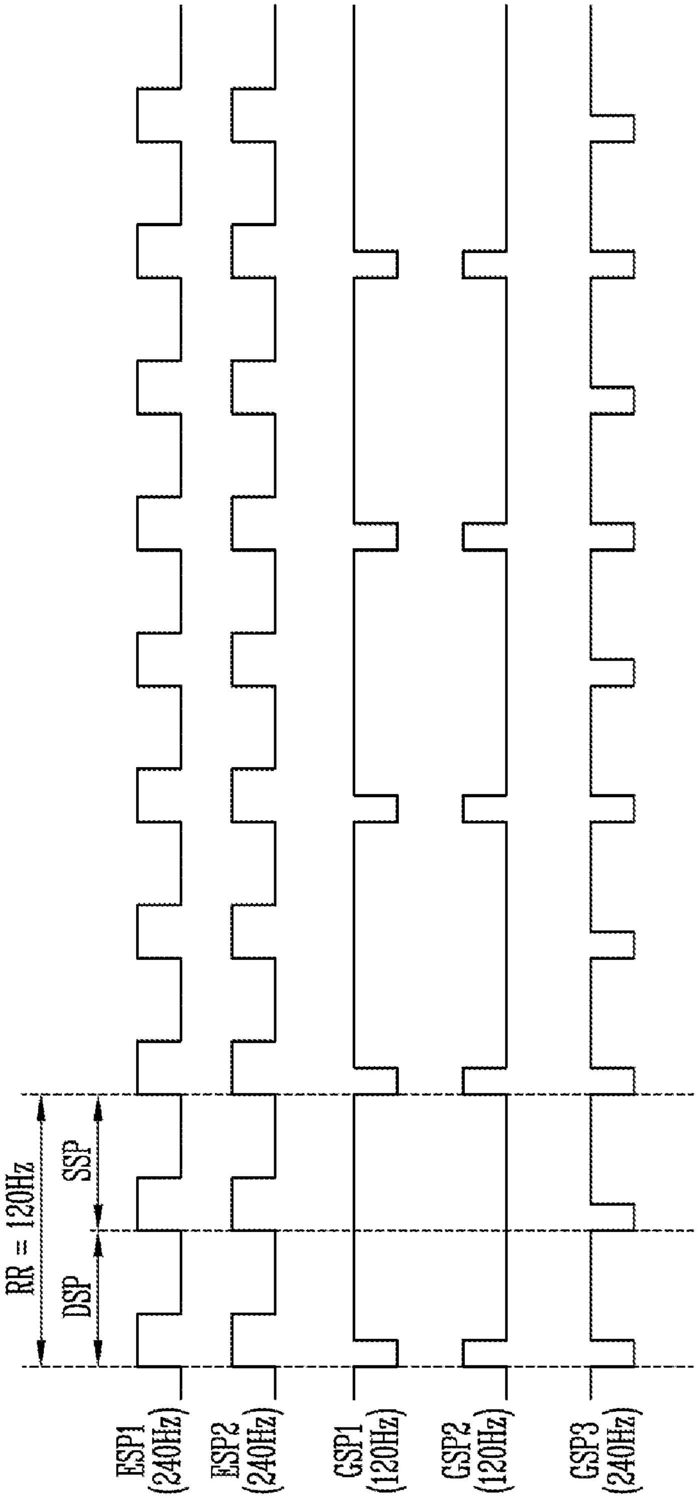
FIGS. 7A, 7B, 7C and 7D are timing diagrams illustrating examples of gate start pulses supplied to an emission driver and a scan driver included in a display device according to an image refresh rate.
Figure 8:
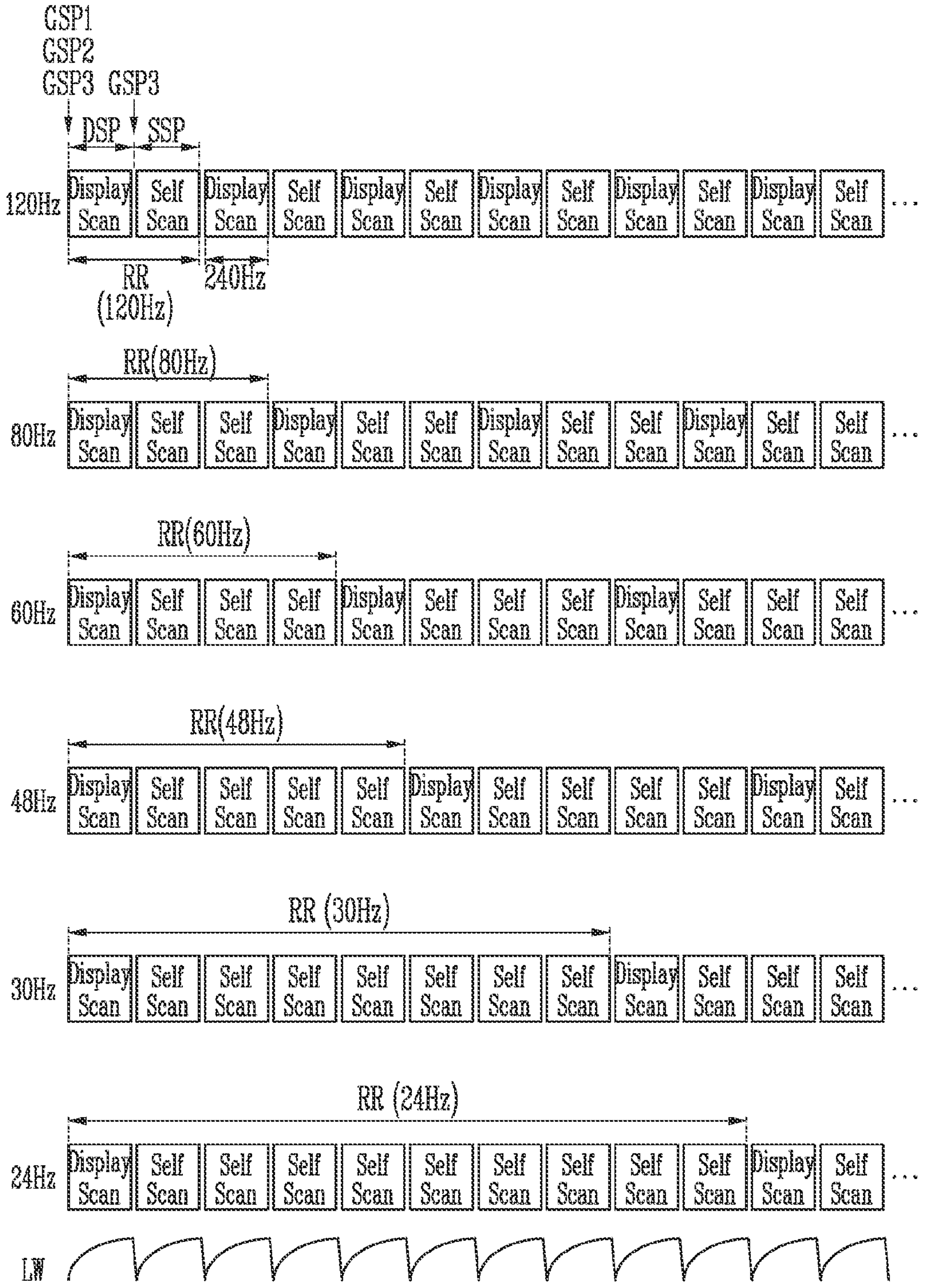
FIG. 8 is a conceptual diagram illustrating an example of a driving method of a display device according to an image refresh rate.

As shown in FIGS. 7A and 8, when the display device 1000 is driven at an image refresh rate RR of 120 Hz, the number of each of the first gate start pulse GSP1 and the second gate start pulse GSP2 supplied during one frame period may be half of the number of the third gate start pulse GSP3. Therefore, one frame period may include one display scan period DSP and one self-scan period SSP when the image refresh rate RR is 120 Hz.

Meanwhile, the first emission start pulse ESP1 and the second emission start pulse ESP2 may be supplied at the same frequency as the third gate start pulse GSP3. When the display device 1000 is driven at the image refresh rate RR of 120 Hz, each of the pixels PX may alternately perform an emission operation and a non-emission operation twice during a frame period.

Figure 7B:
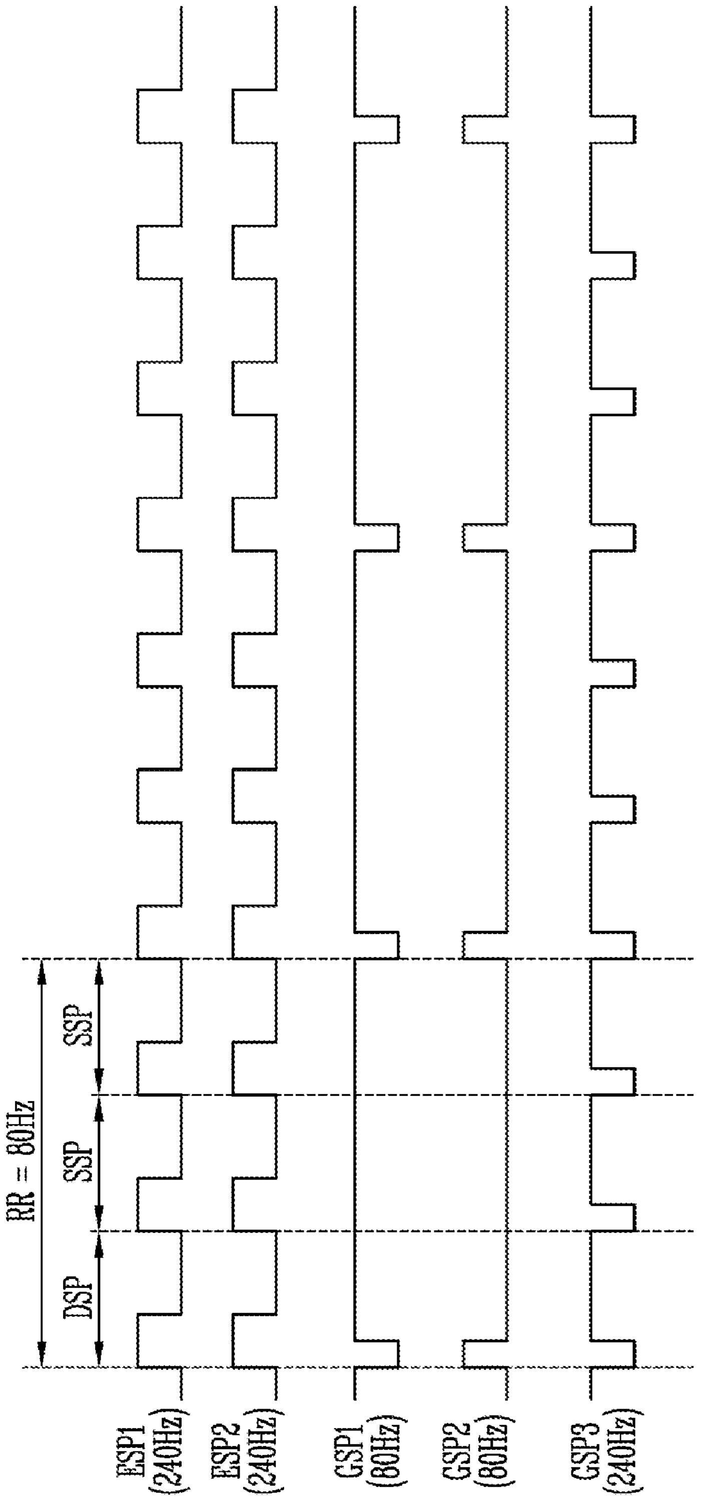

As shown in FIGS. 7B and 8, when the display device 1000 is driven at an image refresh rate RR of 80 Hz, the number of each of the first gate start pulse GSP1 and the second gate start pulse GSP2 supplied for one frame period may be ⅓ times the number of the third gate start pulse GSP3. Therefore, when the display device 1000 is driven at the image refresh rate RR of 80 Hz, one frame period may include one display scan period DSP and two consecutive self-scan periods SSP. In this case, each of the pixels PX may alternately perform an emission operation and a non-emission operation three times.

Figure 7C:
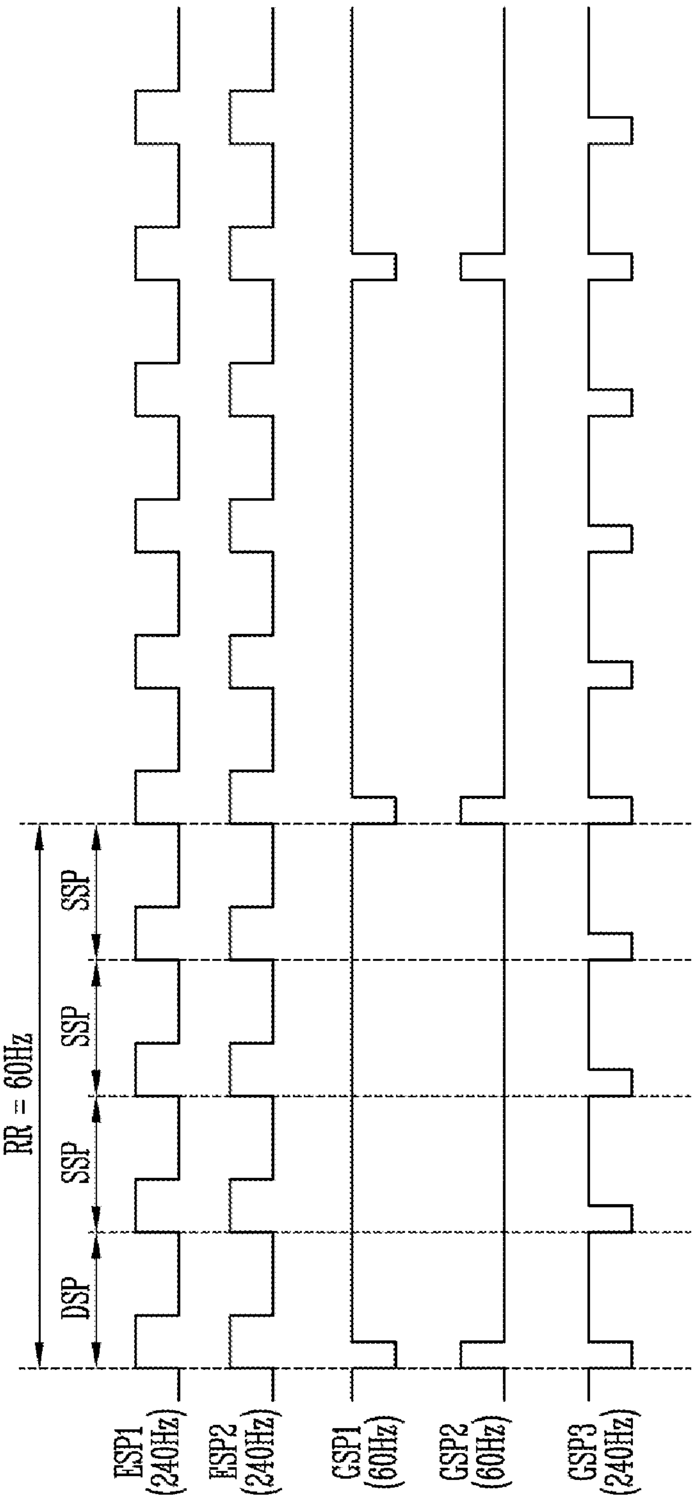

As shown in FIGS. 7C and 8, when the display device 1000 is driven at an image refresh rate RR of 60 Hz, the number of each of the first gate start pulse GSP1 and the second gate start pulse GSP2 supplied for one frame period may be ¼ times the number of the third gate start pulse GSP3. Therefore, when the display device 1000 is driven at the image refresh rate RR of 60 Hz, one frame period may include one display scan period DSP and three consecutive self-scan periods SSP. In this case, each of the pixels PX may alternately perform an emission operation and a non-emission operation four times.

Figure 7D:
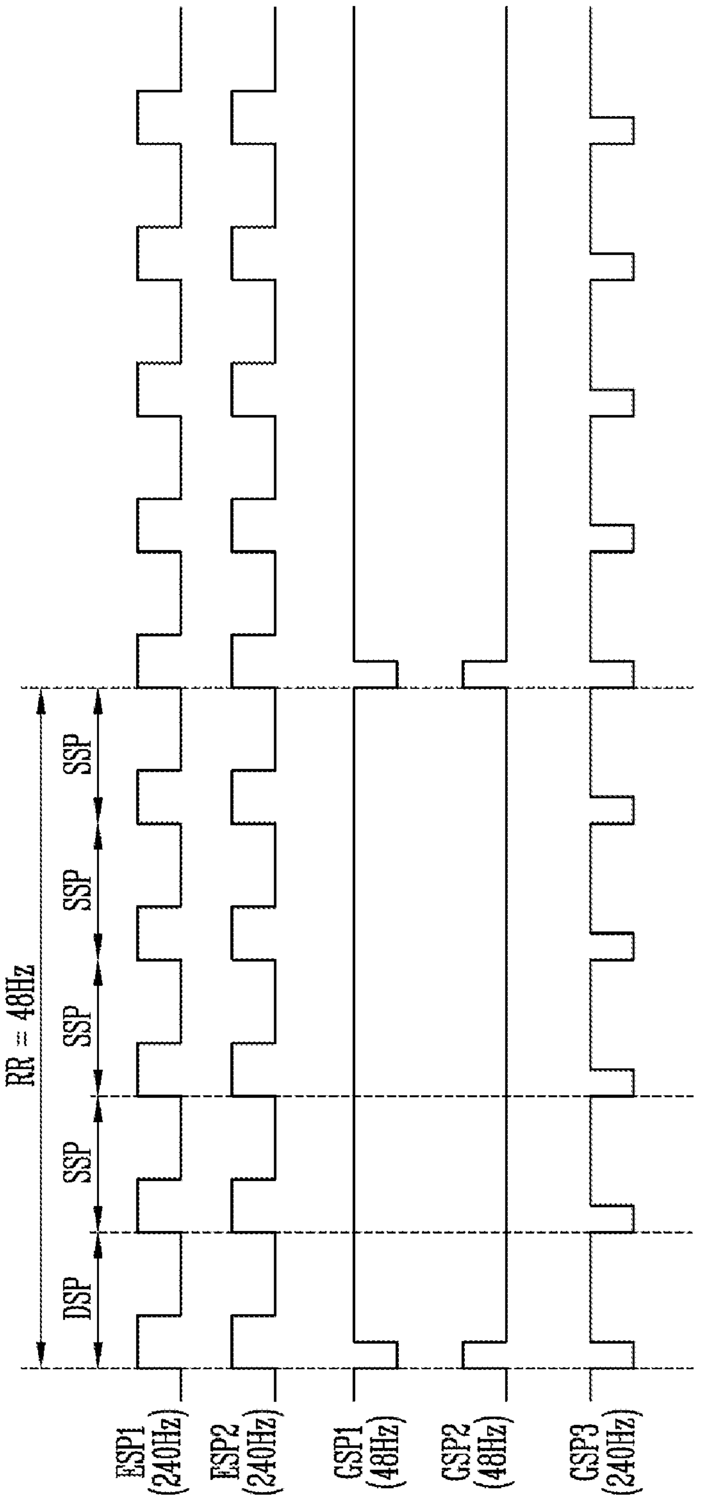

As shown in FIGS. 7D and 8, when the display device 1000 is driven at an image refresh rate RR of 48 Hz, the number of each of the first gate start pulse GSP1 and the second gate start pulse GSP2 supplied for one frame period may be ⅕ times the number of the third gate start pulse GSP3. Therefore, when the display device 1000 is driven at the image refresh rate RR of 48 Hz, one frame period may include one display scan period DSP and four consecutive self-scan periods SSP. In this case, each of the pixels PX may alternately perform an emission operation and a non-emission operation five times As shown in FIG. 8, an optical waveform LW detected from the pixel unit 100 through an experiment may be output at the same period as the third gate start pulse GSP3.

In a similar manner to that described above, the display device 1000 may be driven at a driving frequency of 60 Hz, 30 Hz, 24 Hz, or 1 Hz by adjusting the number of the self-scan periods SSP included in one frame period. In other words, the display device 1000 may support various image refresh rates RRs as frequencies corresponding to a proper divisor of the first frequency.

In addition, as a driving frequency is decreased, the number of the self-scan periods SSP is increased, and thus, on-bias having a certain size may be periodically applied to each of the first transistors M1 included in the pixel unit 100. Therefore, a reduction in luminance, flicker, and an after-image phenomenon may be ameliorated at low frequency driving.

FIGS. 9A to 9D are circuit diagrams illustrating examples of a pixel included in the display device of FIG. 1.

Since pixels of FIGS. 9A to 9D are the same as or similar to the pixel of FIG. 2A except for a configuration of a fourth transistor, the same reference numerals will be used to refer to the same or corresponding components, and redundant descriptions will be omitted.

Referring to FIGS. 9A to 9D, pixels 11, 12, 13, and 14 may include a light-emitting element LD, first to seventh transistors M1 to M7, and a storage capacitor Cst.

In an exemplary embodiment, a gate electrode of the seventh transistor M7 may be connected to a first emission control line E1*i* or a second emission control line E2*i*. Since the seventh transistor M7 is a different type from the fifth and sixth transistors M5 and M6, the seventh transistor M7 may be connected to one of the first emission control line E1*i* and the second emission control line E2*i*.

Figure 9A:
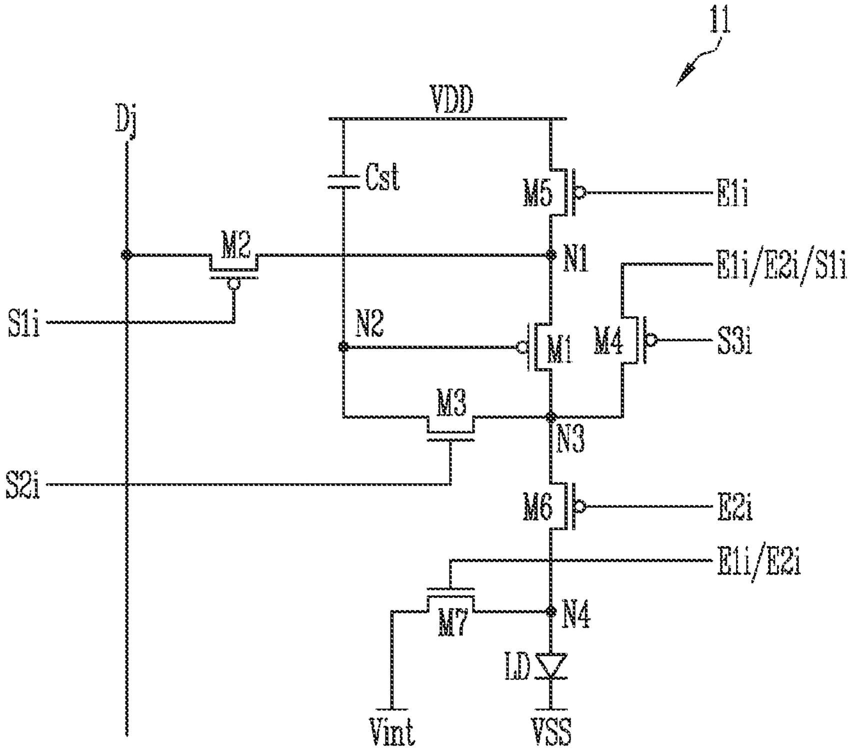
FIGS. 9A, 9B, 9C and 9D are circuit diagrams illustrating examples of a pixel included in the display device of FIG. 1.

As shown in FIG. 9A, a first electrode of the fourth transistor M4 may be connected to one of the first emission control line E1*i*, the second emission control line E2*i*, and a first scan line S1*i*. A second electrode of the fourth transistor M4 may be connected to a third node N3 (that is, a drain electrode of the first transistor M1). When the fourth transistor M4 is turned on, because a logic high level voltage is supplied to all of the first emission control line E1*i*, the second emission control line E2*i*, and the first scan line S1*i*, the first electrode of the fourth transistor M4 can be connected to any one of the first emission control line E1*i*, the second emission control line E2*i*, and the first scan line S1*i*. As shown in FIG. 9A, the first electrode of the fourth transistor M4 may be connected to one of the first emission control line E1*i*, the second emission control line E2*i*, and the first scan line S1*i*.

Figure 9B:
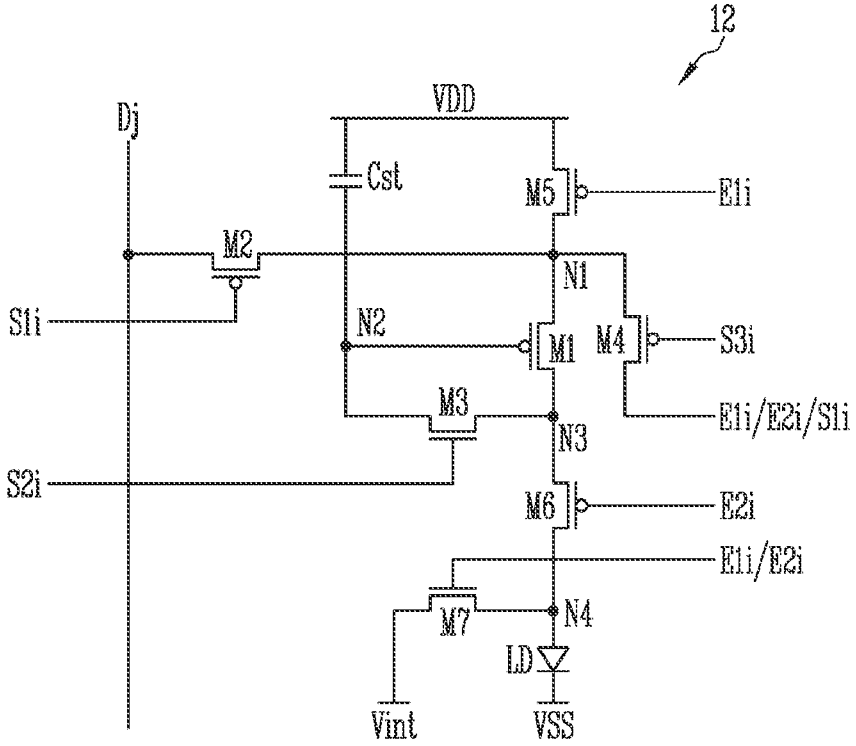

As shown in FIG. 9B, the first electrode of the fourth transistor M4 may be connected to one of the first emission control line E1*i*, the second emission control line E2*i*, and the first scan line S1*i*. The second electrode of the fourth transistor M4 may be connected to a first node N1 (that is, a source electrode of the first transistor M1). As described above, a voltage for on-bias may be supplied to one of the source electrode and the drain electrode of the first transistor M1.

Figure 9C:
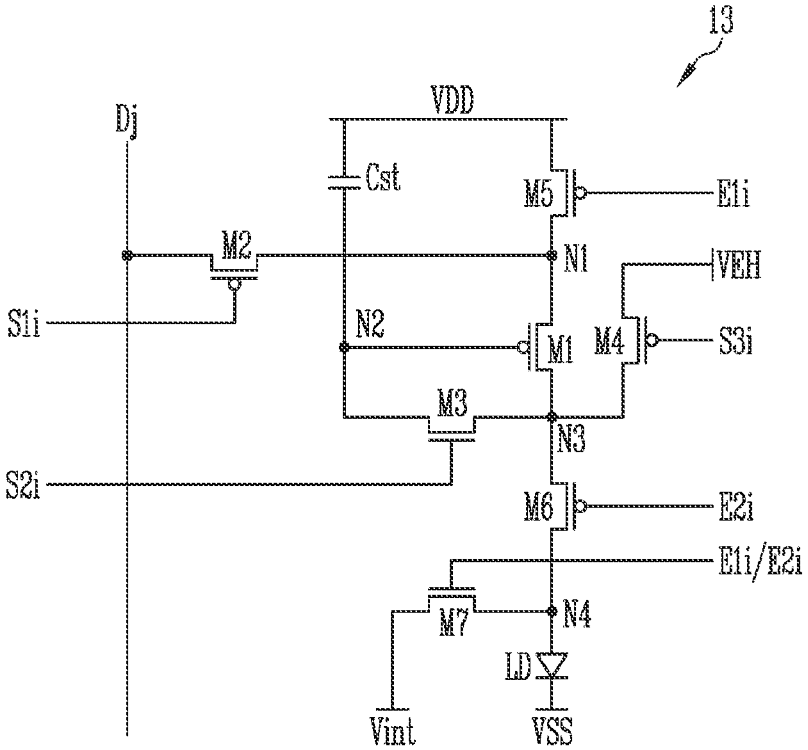

As shown in FIG. 9C, the fourth transistor M4 may be connected to a certain bias power source VEH and the third node N3 (that is, the drain electrode of the first transistor M1). The bias power source VEH may have a voltage level of about 5 V to about 8 V. A voltage level of the bias power source VEH may be easily adjusted according to driving conditions of the display device 1000. In addition, since the bias power source VEH is implemented as a direct current (DC) voltage source, a bias difference between the first transistors M1 may be further reduced.

Figure 9D:
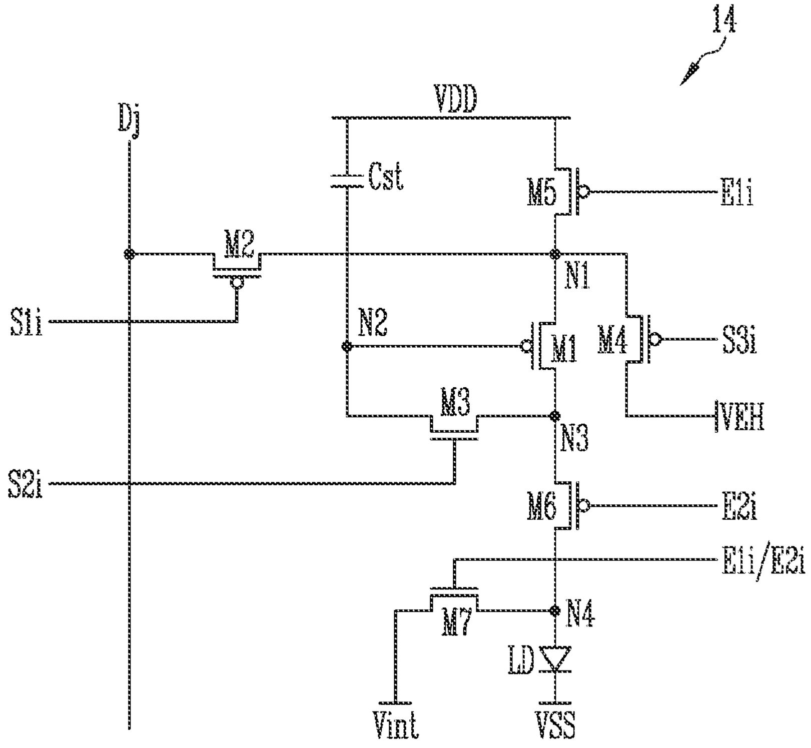

As shown in FIG. 9D, the fourth transistor M4 may be connected to the certain bias power source VEH and the third node N3 (that is, the source electrode of the first transistor M1).

Figure 10A:
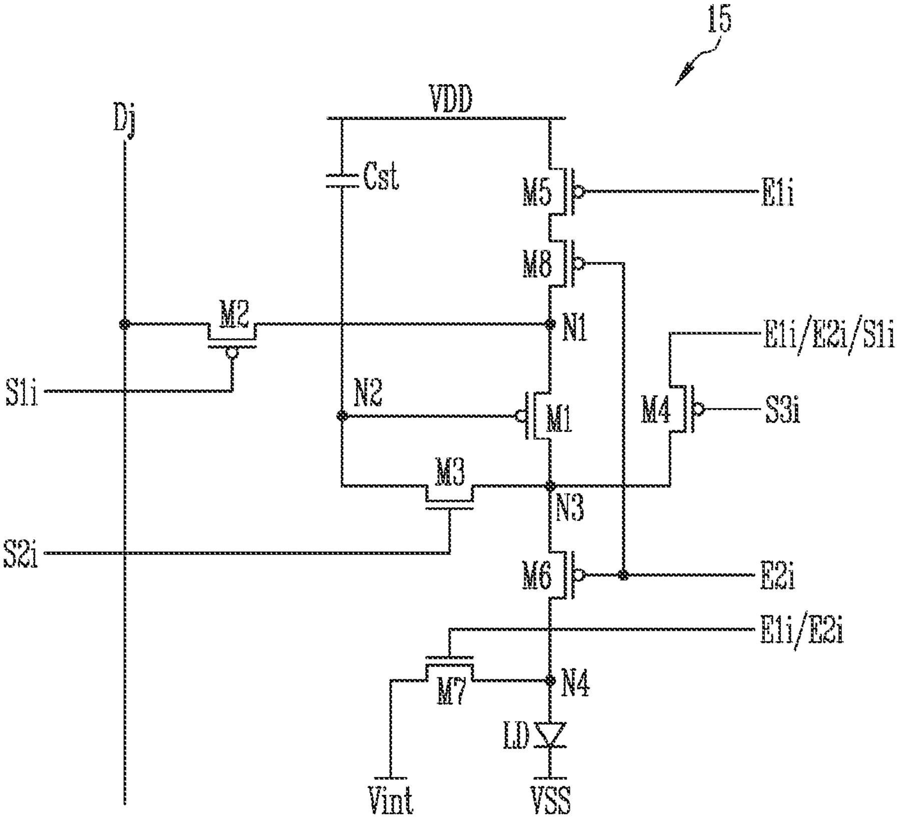
FIGS. 10A and 10B are circuit diagrams illustrating examples of a pixel included in the display device of FIG. 1
Figure 10B:
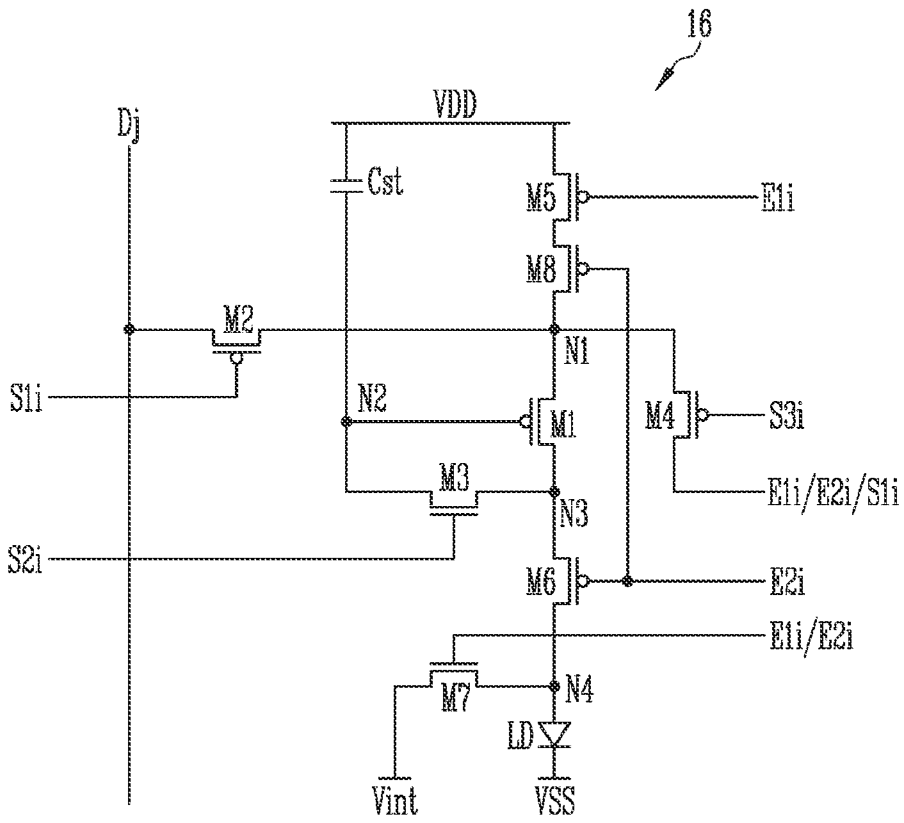

FIGS. 10A and 10B are circuit diagrams illustrating examples of a pixel included in the display device of FIG. 1

Since pixels of FIGS. 10A and 10B are the same as or similar to the pixels of FIGS. 9A to 9D except for a configuration of an eighth transistor, the same reference numerals will be used to refer to the same or corresponding components, and redundant descriptions will be omitted Referring to FIGS. 10A and 10B, pixels 15 and 16 may include a light-emitting element LD, first to eighth transistors M1 to M8, and a storage capacitor Cst.

In an exemplary embodiment, as shown in FIG. 10A, the fourth transistor M4 may be connected to a third node N3. In another exemplary embodiment, as shown in FIG. 10B, the fourth transistor M4 may be connected to a first node N1.

One electrode of the fourth transistor M4 may be connected to one of a first emission control line E1*i*, a second emission control line E2*i*, and a first scan line S1*i*. Alternatively, one electrode of the fourth transistor M4 may be connected to a certain bias power source.

The eighth transistor M8 may be connected between the fifth transistor M5 and the first node N1. The eighth transistor M8 may be turned off by a second emission control signal supplied to the second emission control line E2*i*. Therefore, the eighth transistor M8 may be controlled concurrently with the sixth transistor M6.

The addition of the eighth transistor M8 may facilitate a layout design of a pixel PX. Therefore, an aperture ratio and resolution of the pixel PX may be improved due to the addition of the eighth transistor M8.

Figure 11:
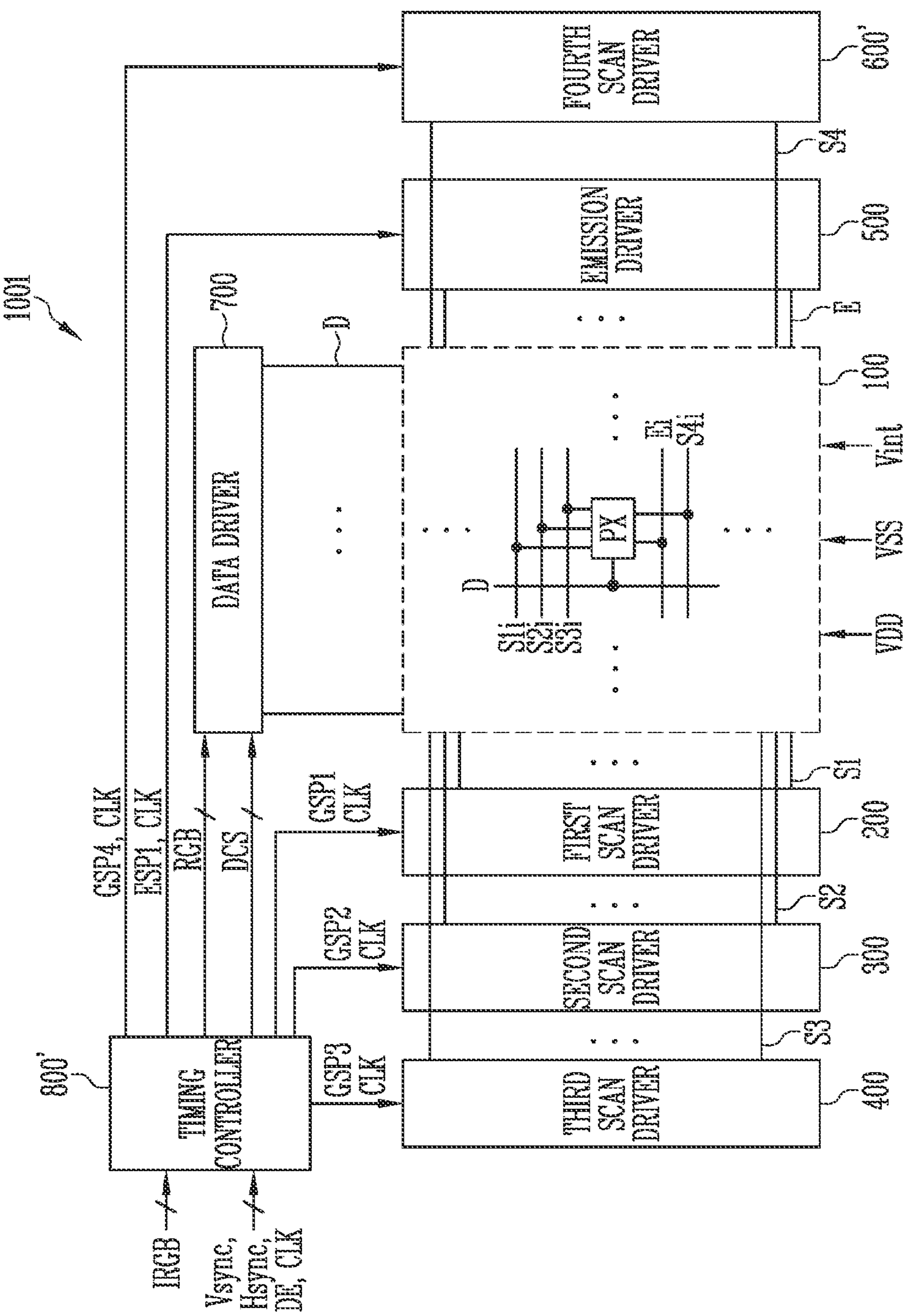
FIG. 11 is a block diagram illustrating a display device according to exemplary embodiments.

FIG. 11 is a block diagram illustrating a display device according to exemplary embodiments.

Since the display device of FIG. 11 is the same as or similar to the display device of FIG. 1 except for a configuration of a fourth scan driver, the same reference numerals will be used to refer to the same or corresponding components, and redundant descriptions will be omitted.

Referring to FIG. 11, a display device 1001 includes a pixel unit 100, a first scan driver 200, a second scan driver 300, a third scan driver 400, an emission driver 500, a fourth scan driver 600', a data driver 700, and a timing controller 800'.

The timing controller 800' supplies gate start pulses GSP1, GSP2, GSP3, and GSP4 and clock signals CLK based on timing signals Vsync, Hsync, DE, and CLK to the first scan driver 200, the second scan driver 300, the third scan driver 400, and the fourth scan driver 600'.

A first gate start pulse GSP1 controls a rising edge or a falling edge of a scan signal supplied from the first scan driver 200. A second gate start pulse GSP2 controls a rising edge or a falling edge of a scan signal supplied from the second scan driver 300. A third gate start pulse GSP3 controls a rising edge or a falling edge of a scan signal supplied from the third scan driver 400.

A fourth gate start pulse GSP4 controls a rising edge or a falling edge of a scan signal supplied from the fourth scan driver 600'.

In an exemplary embodiment, a pulse width of at least one of the first to fourth gate start pulses GSP1 to GSP4 may be different. Therefore, a width of a corresponding scan signal may also be changed.

The data driver 700 supplies data signals to data lines D in response to a data driving control signal DCS. The data signals supplied to the data lines D are supplied to pixels PX selected by the scan signals.

The first scan driver 200 supplies scan signals (writing scan signals) to first scan lines S1 in response to the first gate start pulse GSP1. The first scan driver 200 may supply the scan signals to the first scan lines S1 at a second frequency which corresponds to an image refresh rate. The scan driver 120 may generate the scan signals in a display scan period.

The second scan driver 300 supplies scan signals to second scan lines S2 in response to the second gate start pulse GSP2. The second scan driver 300 supplies scan signals (compensation scan signals) to the second scan lines S2 at the second frequency.

The third scan driver 400 supplies scan signals to third scan lines S3 in response to the third gate start pulse GSP3. The third scan driver 400 may always supply scan signals (bias scan signals) to the third scan lines S3 at a first frequency irrespective of an image refresh rate. That is, the third scan driver 400 may output the scan signals in a display scan period and a self-scan period.

The fourth scan driver 600' supplies scan signals (initialization scan signals) to fourth scan lines S4 in response to the fourth gate start pulse GSP4. The fourth scan driver 600' may supply the scan signals to the fourth scan lines S4 at the second frequency.

The emission driver 500 supplies emission control signals to emission control lines E1 in response to an emission start pulse ESP1. The emission driver 500 may supply the emission control signals to the emission control lines E1 at the first frequency. That is, the emission driver 500 may output the scan signals in the display scan period and the self-scan period.

In an exemplary embodiment, the scan signals output from the first scan driver 200 and the third scan driver 400 may have a gate-on voltage having a logic low level so as to control a p-type transistor. The scan signals output from the second and fourth scan drivers 300 and 600' may have a gate-on voltage having a logic high level so as to control an n-type transistor.

Figure 12A:
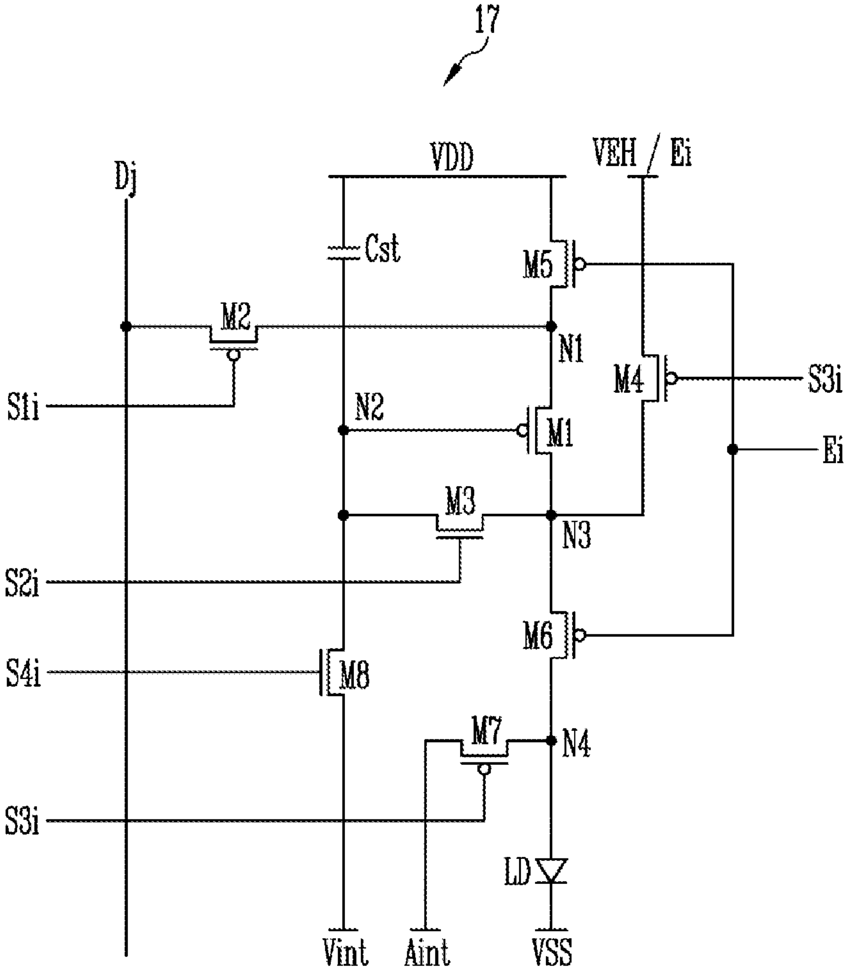
FIGS. 12A, 12B, 12C and 12D are circuit diagrams illustrating examples of a pixel included in the display device of FIG. 11.
Figure 12B:
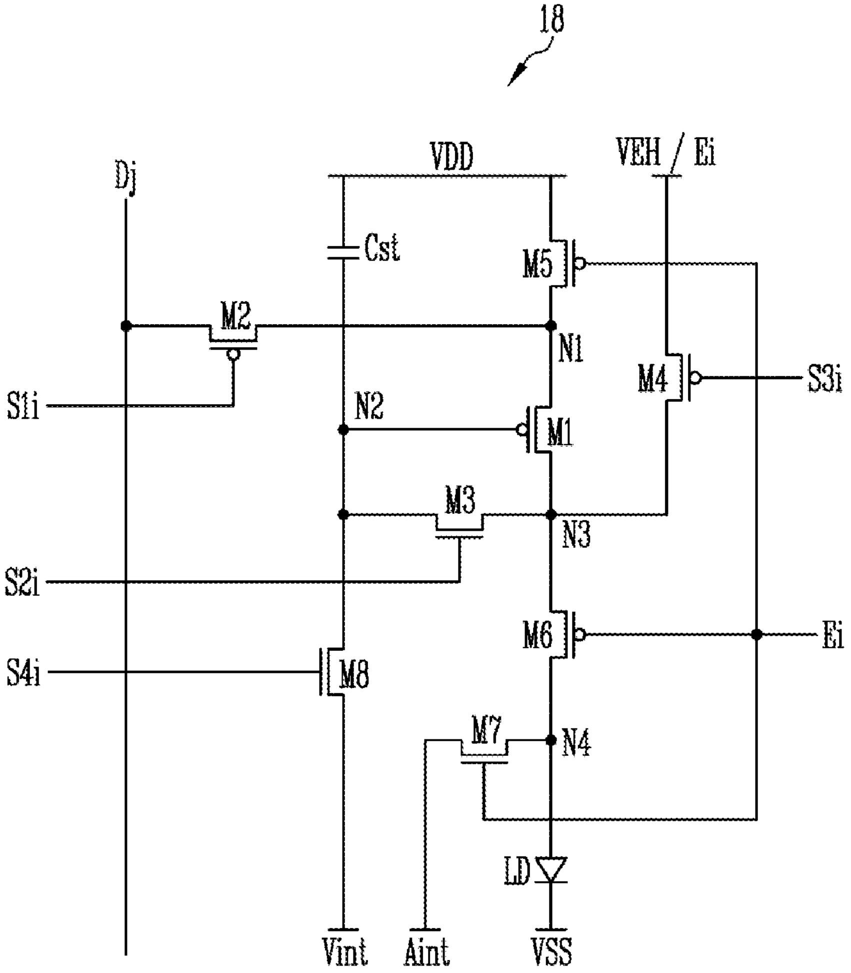
Figure 12C:
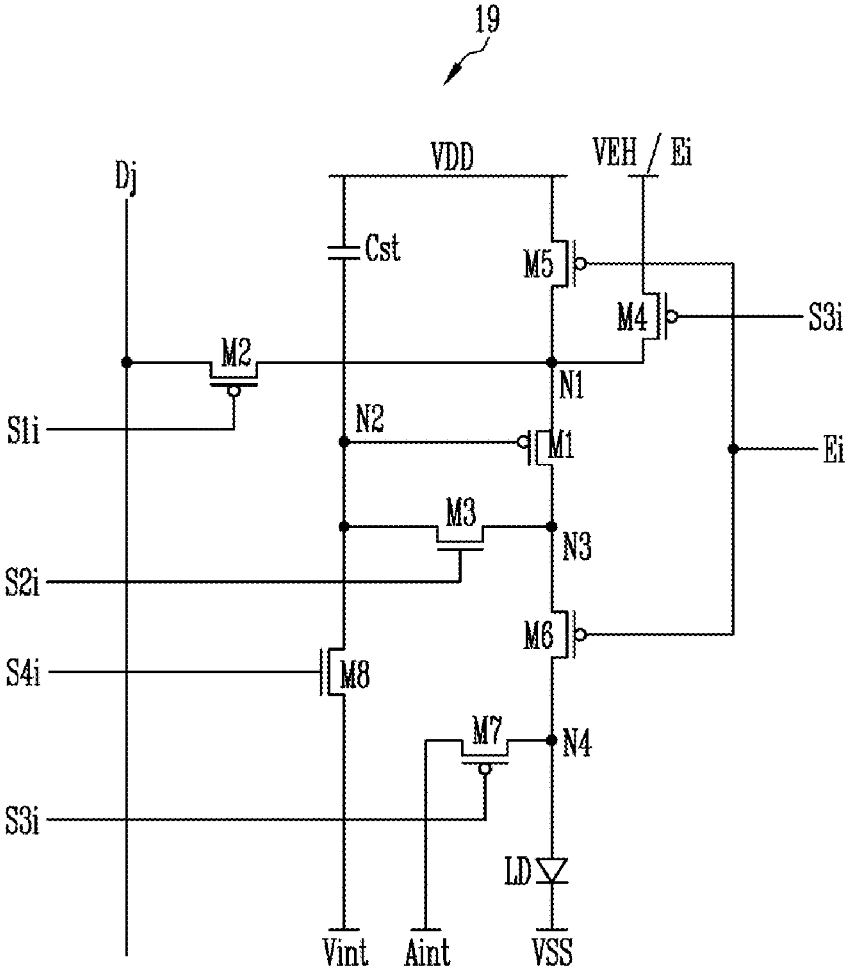
Figure 12D:
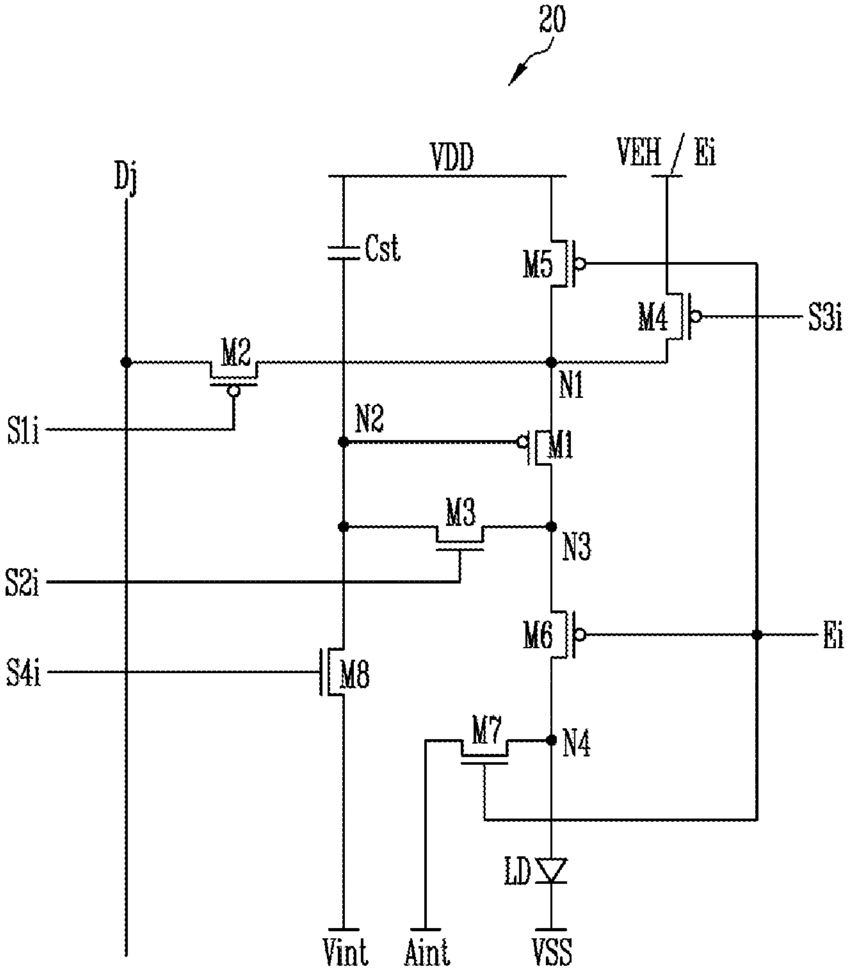

FIGS. 12A and 12D are circuit diagrams illustrating examples of a pixel included in the display device of FIG. 11.

Since pixels of FIGS. 12A and 12B are the same as or similar to the pixel of FIG. 2A except for some connection configurations of fourth to seventh transistors, the same reference numerals will be used to refer to the same or corresponding components, and redundant descriptions will be omitted.

Referring to FIGS. 12A to 12D, pixels 17, 18, 19, and 20 my include a light-emitting element LD, first to eighth transistors M1 to M8, and a storage capacitor Cst.

In an exemplary embodiment, as shown in FIGS. 12A and 12B, the fourth transistor M4 is connected between a third node N3 and an emission control line Ei. A gate electrode of the fourth transistor M4 is connected to a third scan line S3*i*. When a scan signal having a logic low level L is supplied to the third scan line S3*i*, the fourth transistor M4 is turned on to supply a voltage of the emission control line E1*i* to the third node N3. In this case, a gate-off voltage (logic high level voltage) may be supplied to the emission control line Ei. That is, when the fourth transistor M4 is turned on, the first transistor M1 may be on-biased.

However, this is merely an example, and the fourth transistor M4 may be connected between the third node N3 and a certain bias power source VEH.

In another exemplary embodiment, as shown in FIGS. 12C and 12D, the fourth transistor M4 is connected between a first node N1 and an emission control line Ei or between the first node N1 and the bias power source VEH.

The fifth transistor M5 is connected between a first power source VDD and the first node N1. A gate electrode of the fifth transistor T5 is connected to the emission control line Ei.

The sixth transistor M6 is connected between a second electrode of the first transistor M1 (that is, the third node N3) and a first electrode of the light-emitting element LD (that is, a fourth node N4). A gate electrode of the sixth transistor T6 is connected to the emission control line Ei. That is, the fifth transistor M5 and the sixth transistor M6 may be controlled at the same time by the emission control signal.

The eighth transistor M8 may be connected between a second node N2 and a second initialization power source Vint. A gate electrode of the eighth transistor M8 is connected to a fourth scan line S4*i*. When an initialization scan signal is supplied to the fourth scan line S4*i*, the eighth transistor M8 is turned on to supply a voltage of the second initialization power source Vint to the second node N2 (that is, a gate electrode of the first transistor M1). Therefore, a gate voltage of the first transistor M1 may be initialized.

The seventh transistor M7 is connected between the fourth node N4 (that is, the first electrode of the light-emitting element LD) and a first initialization power source Aint. When the seventh transistor is turned on, a voltage of the first initialization power source Aint may be supplied to the fourth node N4.

In an exemplary embodiment, as shown in FIGS. 12A and 12C, a gate electrode of the seventh transistor M7 may be connected to the third scan line S3*i*. In this case, the seventh transistor M7 may be a p-type transistor and may be controlled concurrently with the fourth transistor M4. That is, when on-bias is applied to the first transistor M1, the voltage of the first initialization power source Aint may be applied to the first electrode of the light-emitting element LD.

In an exemplary embodiment, as shown in FIGS. 12B and 12D, the gate electrode of the seventh transistor M7 may be connected to the emission control line Ei. In this case, the seventh transistor M7 may be an n-type transistor and may be controlled in an opposite manner to the fifth transistor M5. Therefore, the seventh transistor M7 may be turned off when the fifth transistor M5 and the sixth transistor M6 are turned on. Therefore, during a non-emission period, the voltage of the first initialization power source Aint may be applied to the first electrode of the light-emitting element LD (fourth node N4).

In an exemplary embodiment, the first initialization power source Aint and the second initialization power source Vint may generate different voltages. That is, a voltage for initializing the second node N2 and a voltage for initializing the fourth node N4 may be set differently.

In low frequency driving in which a length of one frame period is increased, when the voltage of the second initialization power source Vint supplied to the second node N2 is too low, hysteresis of the first transistor M1 in a corresponding frame period is abruptly changed. Such hysteresis change may cause flicker in low frequency driving. Therefore, a display device driven at a low frequency may require a voltage of the second initialization power source Vint that is higher than a voltage of a second power source VSS.

On the other hand, in order to prevent a parasitic capacitor of the light-emitting element LD from being charged with the voltage of the first initialization power source Aint supplied to the fourth node N4, the first initialization power source Aint may have a voltage lower than a certain reference level. For example, the first initialization power source Aint may have a voltage similar to that of the second power source VSS. However, this is merely an example, and the voltage of the first initialization power source Aint may be higher or lower than the voltage of the second power source VSS according to a driving condition of a display device.

As described above, the pixels 17, 18, 19, and 20 of FIGS. 12A to 12D may additionally initialize the gate voltage of the first transistor M1. Therefore, image quality of the display device 1001 may be improved.

Figure 13:
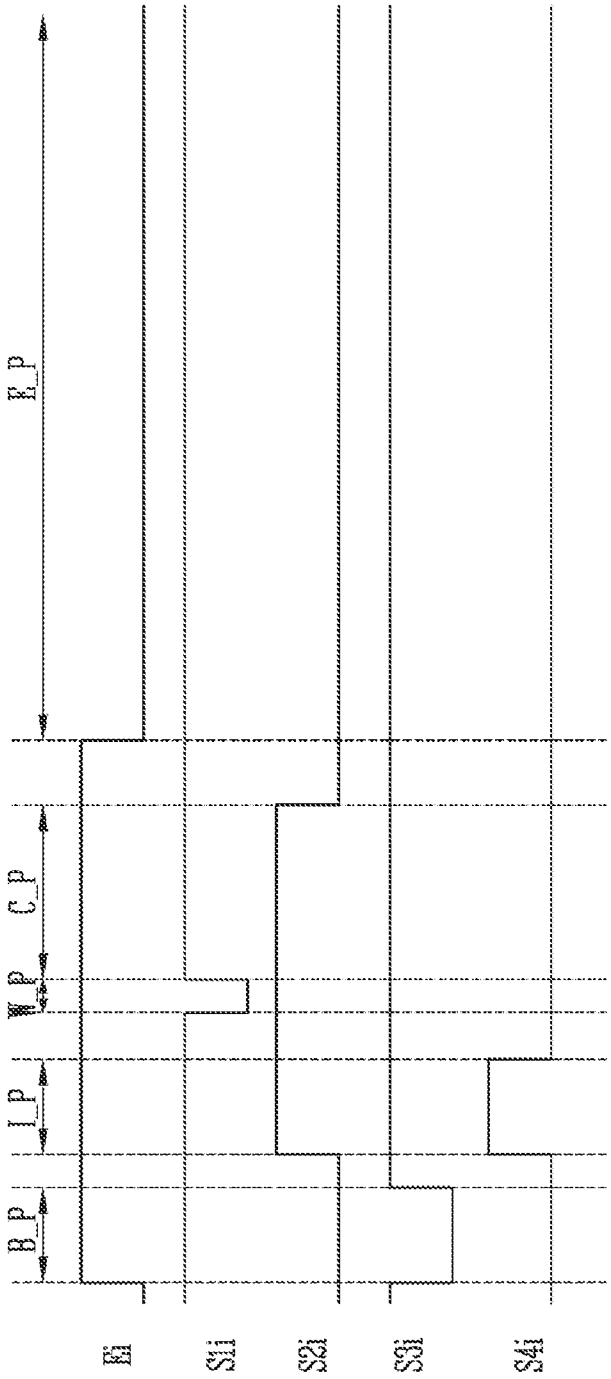
FIG. 13 is a timing diagram illustrating an example of driving of the pixels of FIGS. 12A to 12D.
Figure 14A:
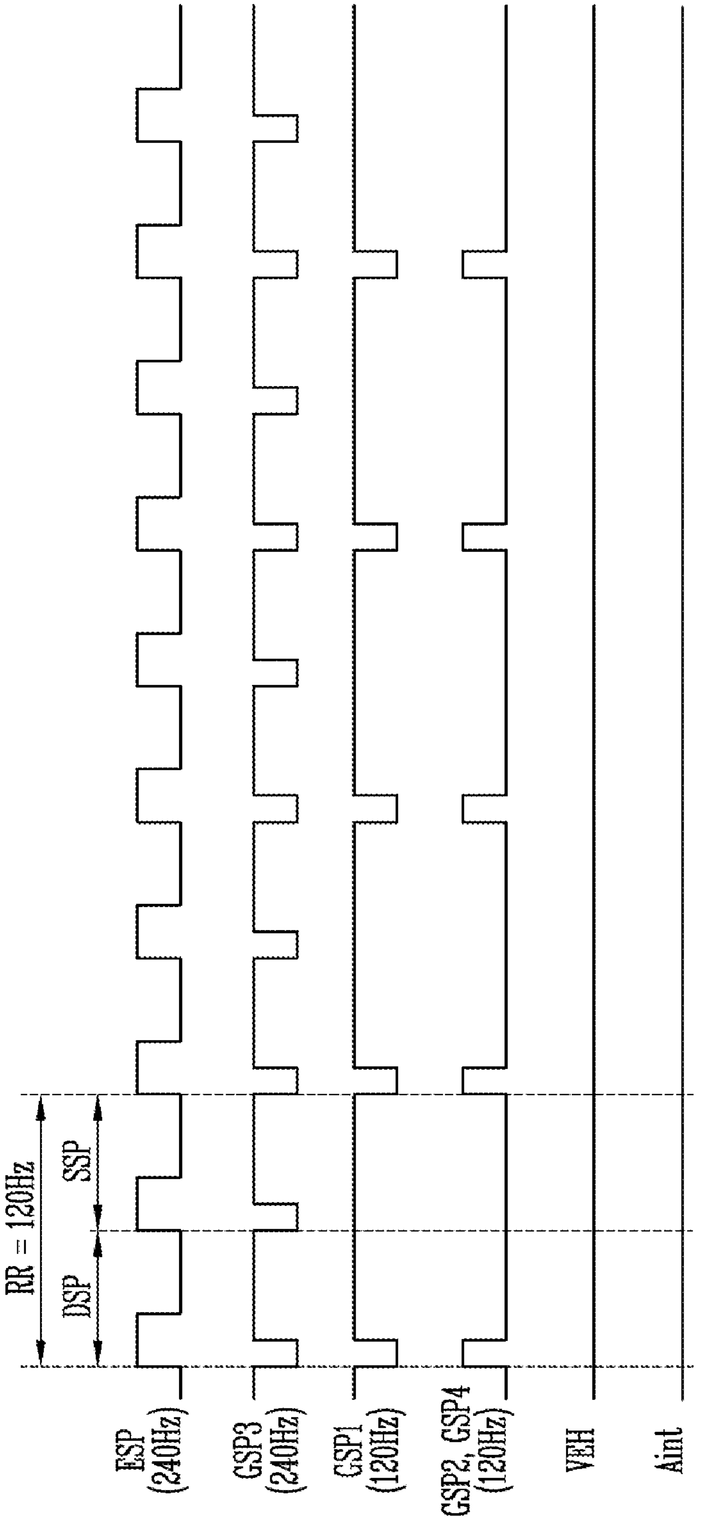
FIGS. 14A, 14B, 14C and 14D are timing diagrams illustrating examples of a driving method of a display device according to an image refresh rate.
Figure 14B:
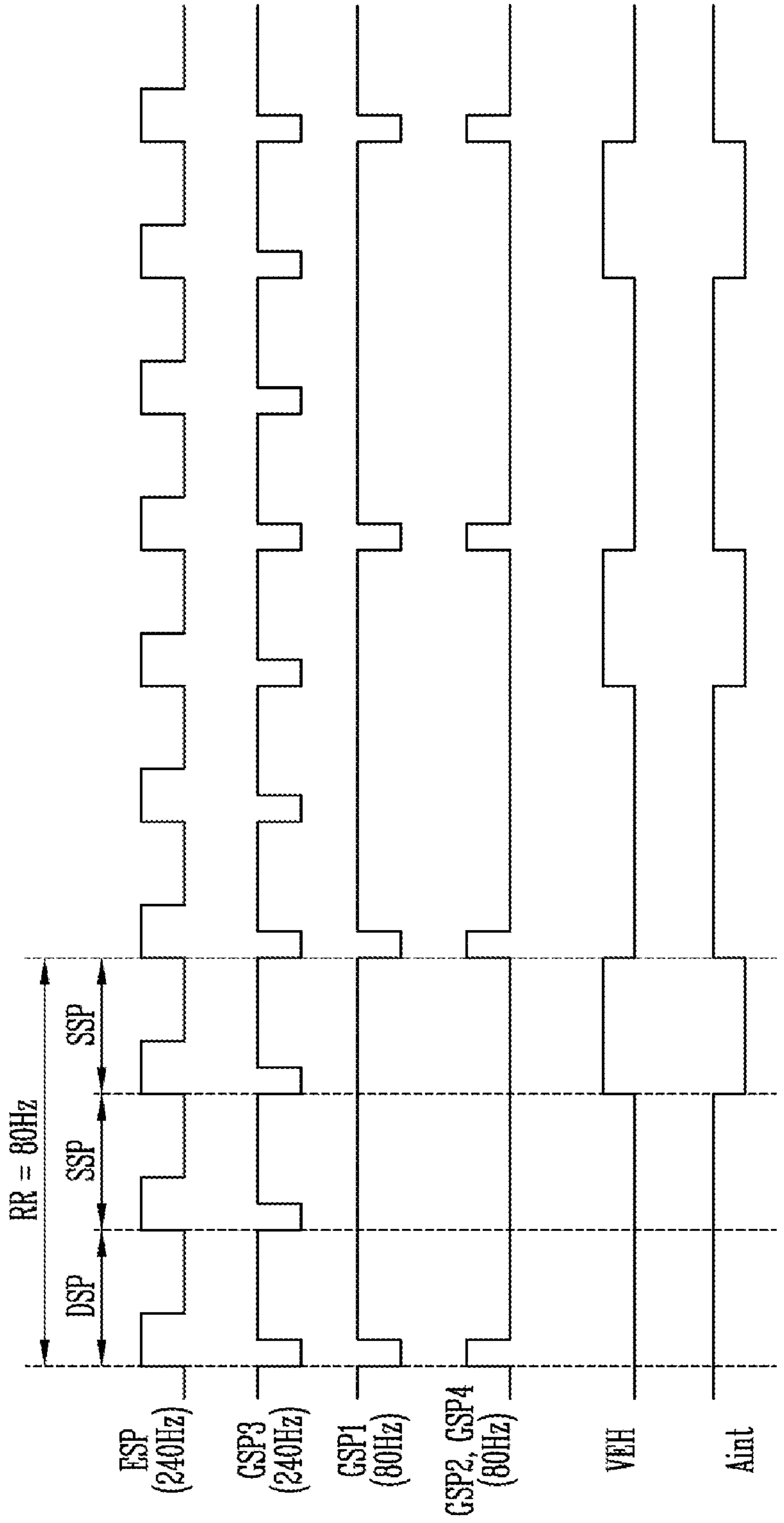
Figure 14C:
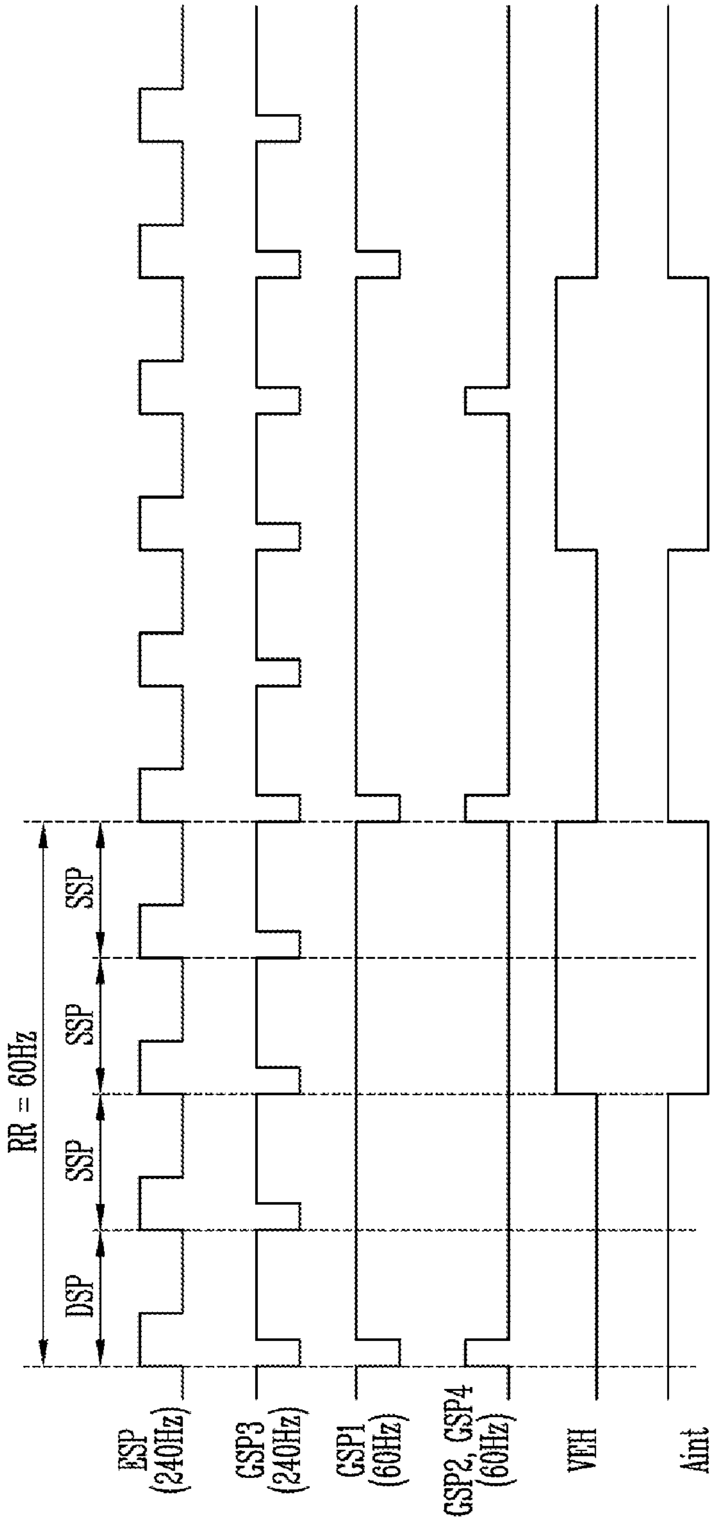
Figure 14D:
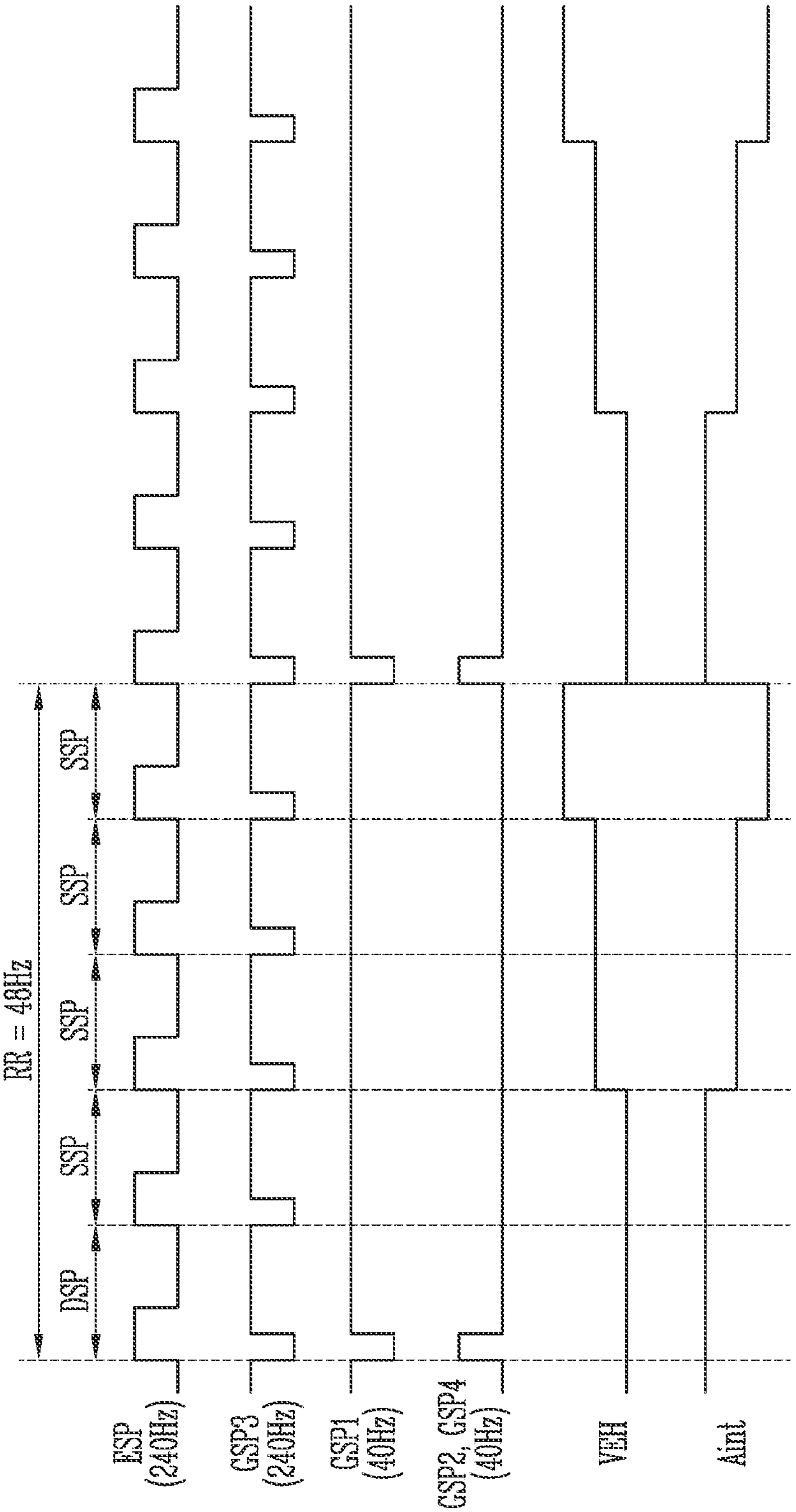

FIG. 13 is a timing diagram illustrating an example of driving of the pixels of FIGS. 12A to 12D.

Referring to FIGS. 12A to 13, the pixels 17, 18, 19, and 20 may receive signals for displaying an image during a display scan period. The display scan period may include a period in which a data signal corresponding to an output imaged is written.

A non-emission period of the display scan period may include a bias period B_P, an initialization period I_P, a writing period W_P, and a compensation period C_P. Thereafter, the pixels 17, 18, 19, and 20 may emit light with certain luminance in the emission period E_P.

The bias period B_P may precede the initialization period I_P. The fourth and seventh transistors M4 and M7 are turned on in response to a scan signal (bias scan signal) supplied to the third scan line S3*i* and the emission control signal supplied to the emission control line Ei, respectively, in the bias period B_P. Accordingly, on-bias may be applied to the first transistor M1, and the voltage of the first initialization power source Aint may be applied to the fourth node N4. When the fourth transistor M4 is turned off, the bias period B_P ends.

Thereafter, in the initialization period I_P, the third transistor M3 may be turned on in response to a scan signal (compensation scan signal) supplied to the second scan line S2*i*, and the eighth transistor M8 may be turned on in response to a scan signal (initialization scan signal) supplied to the fourth scan line S4*i*. Therefore, the voltage of the second initialization power source Vint may be supplied to the second node N2. The third transistor M3 may maintain a turn-on state during the compensation period C_P. When the eighth transistor M8 is turned off, the initialization period I_P ends.

Thereafter, in the writing period W_P, the second transistor M2 may be turned on in response to a scan signal (writing scan signal) supplied to the first scan line S1*i*. Therefore, a data signal may be supplied to the first node N1. When the second transistor M2 is turned off, the writing period W_P ends.

Thereafter, in the compensation period C_P, a threshold voltage of the first transistor M1 may be compensated by the third transistor M3 which is turned on. When the third transistor M3 is turned off, the compensation period C_P ends.

Thereafter, in the emission period E_P, the fifth and sixth transistors M5 and M6 may be turned on, and the light-emitting element LD may emit light in response to a data signal supplied to the first node N1.

FIGS. 14A to 14D are timing diagrams illustrating examples of a driving method of a display device according to an image refresh rate.

Since the driving method of FIGS. 14A to 14D is the same as or similar to the driving method of FIGS. 7A to 7D except for a driving method of a fourth gate pulse GSP4, a first initialization power source Aint, and a bias power source VEH, the same reference numerals will be used to refer to the same or corresponding components, and redundant descriptions will be omitted.

Referring to FIGS. 11 and 14A to 14D, output frequencies of a first gate start pulse GSP1, a second gate start pulse GSP2, and a fourth gate start pulse GSP4 may be changed according to an image refresh rate RR. In addition, a voltage level of the first initialization power source Aint and/or a voltage level of the bias power source VEH may be controlled according to the image refresh rate RR.

In an exemplary embodiment, voltages of the first initialization power source Aint and the bias power source VEH may be output and controlled from a certain power driver.

Irrespective of a driving frequency, the timing controller 800' may output the emission start pulse ESP and the third gate start pulse GSP3 at a constant frequency (first frequency), for example, 240 Hz.

The timing controller 800' may output the first gate start pulse GSP1, the second gate start pulse GSP2, and the fourth gate start pulse GSP4 at the same frequency (second frequency) as the image refresh rate RR, for example, 120 Hz, 80 HZ, 60 HZ, or 40 Hz. One frame period of a display device may be determined by an output period of the first gate start pulse GSP1.

As the image refresh rate RR is decreased, the number of the self-scan periods SSP included in one frame period may be increased.

Meanwhile, modulation of the bias power source VEH may be applied in response to a change in image refresh rate RR. In an exemplary embodiment, the voltage level of the bias power source VEH may be increased in response to the repetition of the self-scan period SSP. That is, as the image refresh rate RR is decreased, stronger on-bias may be applied to the first transistor M1 in one frame period as time passes.

For example, the voltage level of the bias power source VEH may be increased at about 8.3 ms intervals so as to correspond to 120 Hz. A voltage of the bias power source VEH may be changed in a range of about 5 V to about 7.5 V.

On the other hand, the voltage level of the bias power source VEH returns to a value set to be the lowest in the display scan period DSP again. That is, a change in voltage of the bias power source VEH may be repeated in a frame unit.

In an exemplary embodiment, the modulation of the first initialization power source Aint may be applied in response to a change in image refresh rate RR. In an exemplary embodiment, the voltage level of the first initialization power source Aint may be gradually decreased in response to the repetition of the self-scan period SSP. That is, as the image refresh rate RR is decreased, a lower initialization voltage may be applied to the light-emitting element LD within one frame period as time passes.

For example, the voltage level of the bias power source VEH may be increased at an interval of about 8.3 ms so as to correspond to 120 Hz. The voltage of the first initialization power source Aint may be changed in a range of about −1 V to about 5 V.

On the other hand, the voltage level of the first initialization power source Aint returns to a value set to be the highest in the display scan period DSP again. That is, a change in voltage of the first initialization power source Aint may be repeated in a frame unit.

As described above, the voltage levels of the bias power source VEH and/or the first initialization power source Aint may be adaptively adjusted according to the image refresh rate RR. Therefore, image quality in low frequency driving may be further improved.

As described above, the display device according to the exemplary embodiments of the present may include one display scan period and at least one self-scan period in one frame to support image output at various driving frequencies. In addition, as a driving frequency is decreased, the number of self-scan periods is increased, and thus, a reduction in luminance and flicker visibility may be improved in low frequency driving.

Furthermore, irrespective of a data signal and a grayscale level of an image, a voltage for biasing may be periodically applied to the first transistor through the bias scan transistor (M4) at a constant voltage, thereby reducing hysteresis (threshold shift difference) between adjacent pixels due to an on-bias difference (and a grayscale level difference). Therefore, an afterimage phenomenon (ghost phenomenon) due to a hysteresis deviation may be reduced or removed.

However, effects of the present inventive concept are not limited to the above-described effect, but variously modified without departing from the spirit and scope of the present inventive concept.

Although the present inventive concept has been described with reference to the exemplary embodiments, those skilled in the art will appreciate that various modifications and variations can be made in the present inventive concept without departing from the spirit or scope of the inventive concept described in the appended claims.

What is claimed is:

1. A display device, comprising:
pixels;
first scan lines connected to the pixels to supply first scan signals to the pixels at a second frequency which corresponds to an image refresh rate of the pixels;
second scan lines connected to the pixels to supply second scan signals different from the first scan signals to the pixels at the second frequency; and
third scan lines connected to the pixels to supply third scan signals to the pixels at a first frequency,
wherein a pixel disposed on an i-th horizontal line of the pixels comprises:
a light emitting element including a first electrode, and a second electrode connected to a second power supply;
a first transistor including a first electrode connected to a first node electrically connected to a first power supply, and configured to control a driving current based on a voltage of a second node;
a second transistor connected between a data line and the first node, and turned on by one of the first scan signals supplied to an i-th first scan line of the first scan lines;
a third transistor connected between the second node and a third node connected to a second electrode of the first transistor, and turned on by one of the second scan signals supplied to an i-th second scan line of the second scan lines; and
a fourth transistor connected between the first node and an i-th emission control line or between the first node and a bias power source, and turned on by one of the third scan signals supplied to an i-th third scan line, and
wherein i is a natural number.

2. The display device of claim 1, wherein the first frequency is greater than the second frequency.

3. The display device of claim 1, wherein the first frequency corresponds to twice a maximum refresh rate of the display device.

4. The display device of claim 1, further comprising data lines connected to the pixels to supply data signals to the pixels based on the second frequency.

5. The display device of claim 1, further comprising:
emission control lines connected to the pixels to supply emission control signals to the pixels at the first frequency,
wherein the pixel disposed on the i-th horizontal line further comprises:
a fifth transistor connected between the first power supply and the first node, and configured to be turned off by one of the emission control signals supplied to an i-th emission control line of the emission control lines; and
a sixth transistor connected between the third node and the first electrode of the light-emitting element and turned off by the one of the emission control signals supplied to the i-th emission control line.

6. The display device of claim 5, wherein the pixel disposed on the i-th horizontal line further comprises:
a seventh transistor connected between the first electrode of the light-emitting element and a first initialization power source and is turned on by the third scan signals; and
an eighth transistor connected between the second node and a second initialization power source and turned on by a fourth scan signal supplied to an i-th fourth scan line, and
wherein the second frequency corresponds to a proper divisor of the first frequency.

7. The display device of claim 6, wherein each of the first transistor, the second transistor, the fifth transistor, and the sixth transistor is a P-type transistor, and
wherein each of the third transistor and the eighth transistor is an N-type oxide semiconductor transistor.

8. The display device of claim 1, wherein the pixel disposed on the i-th horizontal line further comprises a storage capacitor connected between the first power supply and the second node.

9. A display device comprising:
pixels;
first scan lines connected to the pixels to supply first scan signals to the pixels at a second frequency which corresponds to an image refresh rate of the pixels;

second scan lines connected to the pixels to supply second scan signals different from the first scan signals to the pixels at the second frequency;

third scan lines connected to the pixels to supply third scan signals to the pixels at a first frequency; and emission control lines connected to the pixels to supply emission control signals to the pixels at the first frequency, wherein one of the third scan signals has the same number of falling edges as one of the emission control signals during a frame period.

10. The display device according to claim 9, wherein the first frequency is greater than the second frequency.

11. The display device of claim 9, wherein the second frequency corresponds to a proper divisor of the first frequency.

12. The display device of claim 9, wherein the first frequency corresponds to twice a maximum refresh rate of the display device.

13. The display device according to claim 9, further comprising:

fourth scan lines connected to the pixels to supply a fourth scan signal to the pixels at the second frequency.

14. The display device of claim 9, further comprising:

data lines connected to the pixels to supply data signals to the pixels based on the second frequency.

15. The display device according to claim 14, further comprising:

a first scan driver configured to supply the first scan signals to the first scan lines;

a second scan driver configured to supply the second scan signals to the second scan lines;

a third scan driver configured to supply the third scan signals to the third scan lines; and a data driver configured to supply the data signals to the data lines.

16. The display device according to claim 15, wherein the first scan driver and the second scan driver are configured to supply the first scan signals and the second scan signals during a display scan period in the frame period not to supply the first scan signals and the second scan signals during a self-scan period in the frame period, wherein the data signals are written to the pixels in the display scan period, and wherein the third scan driver is configured to supply the third scan signals in the display scan period and the self-scan period so that bias is applied to a driving transistor included in each of the pixels.

17. The display device according to claim 16, wherein, as the image refresh rate decreases, the number of the self-scan periods increases.

* * * * *